(12) United States Patent
Iwasaki et al.

(10) Patent No.: US 11,437,059 B2
(45) Date of Patent: Sep. 6, 2022

(54) MAGNETIC HEAD AND MAGNETIC RECORDING DEVICE WITH STACKED BODY MATERIAL CONFIGURATIONS

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hitoshi Iwasaki, Tokyo (JP); Masayuki Takagishi, Tokyo (JP); Naoyuki Narita, Chiba (JP); Tazumi Nagasawa, Kanagawa (JP); Hirofumi Suto, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/015,373

(22) Filed: Sep. 9, 2020

(65) Prior Publication Data

US 2021/0142821 A1 May 13, 2021

(30) Foreign Application Priority Data

Nov. 7, 2019 (JP) ............................. JP2019-202653
Sep. 3, 2020 (JP) ............................. JP2020-148037

(51) Int. Cl.
*G11B 5/235* (2006.01)
*G11B 5/31* (2006.01)
(Continued)

(52) U.S. Cl.
CPC ............ *G11B 5/235* (2013.01); *G11B 5/1278* (2013.01); *G11B 5/314* (2013.01); *G11B 5/3146* (2013.01);
(Continued)

(58) Field of Classification Search
None
See application file for complete search history.

(56) References Cited

U.S. PATENT DOCUMENTS 10,366,714 B1   7/2019  Olson et al.
10,950,258 B1 * 3/2021  Gao et al. ............ G11B 5/3146
(Continued)

FOREIGN PATENT DOCUMENTS

JP    2013-246852 A   12/2013
JP    2014-130672 A    7/2014
JP    2019-57337 A     4/2019

*Primary Examiner* — Craig A. Renner
(74) *Attorney, Agent, or Firm* — Finnegan, Henderson, Farabow, Garrett & Dunner L.L.P.

(57) ABSTRACT

According to one embodiment, a magnetic recording device includes a magnetic head, and an electrical circuit. The magnetic head includes a first magnetic pole, a second magnetic pole, and a stacked body provided between the first and the second magnetic poles. The stacked body includes a first nonmagnetic layer, a first magnetic layer provided between the first nonmagnetic layer and the second magnetic pole, a first layer provided between the first magnetic layer and the second magnetic pole, a second nonmagnetic layer provided between the first layer and the second magnetic pole, a second magnetic layer provided between the second nonmagnetic layer and the second magnetic pole, and a third nonmagnetic layer provided between the second magnetic layer and the second magnetic pole. The electrical circuit supplies, to the stacked body, a first current having a first orientation from the second magnetic pole toward the first magnetic pole.

14 Claims, 11 Drawing Sheets

(51) Int. Cl.
*G11B 5/127* (2006.01)
*G11B 5/00* (2006.01)
*G11B 5/245* (2006.01)

(52) U.S. Cl.
CPC .......... G11B 5/3156 (2013.01); *G11B 5/1276* (2013.01); *G11B 5/2457* (2013.01); *G11B 5/315* (2013.01); *G11B 2005/0008* (2013.01); *G11B 2005/0018* (2013.01); *G11B 2005/0024* (2013.01); *G11B 2005/0034* (2013.01)

(56) References Cited

U.S. PATENT DOCUMENTS

| | | | |
|---|---|---|---|
| 2008/0268291 A1* | 10/2008 | Akiyama et al. ...... | G11B 5/314 428/812 |
| 2012/0154952 A1* | 6/2012 | Yamada et al. ...... | G11B 5/3146 360/125.12 |
| 2012/0176702 A1* | 7/2012 | Yamada et al. ...... | G11B 5/3146 360/125.12 |
| 2013/0050869 A1* | 2/2013 | Nagasaka et al. ... | G11B 5/3146 360/125.01 |
| 2013/0314820 A1 | 11/2013 | Shimizu et al. | |
| 2014/0146420 A1 | 5/2014 | Shimizu et al. | |
| 2019/0088274 A1 | 3/2019 | Narita et al. | |

* cited by examiner

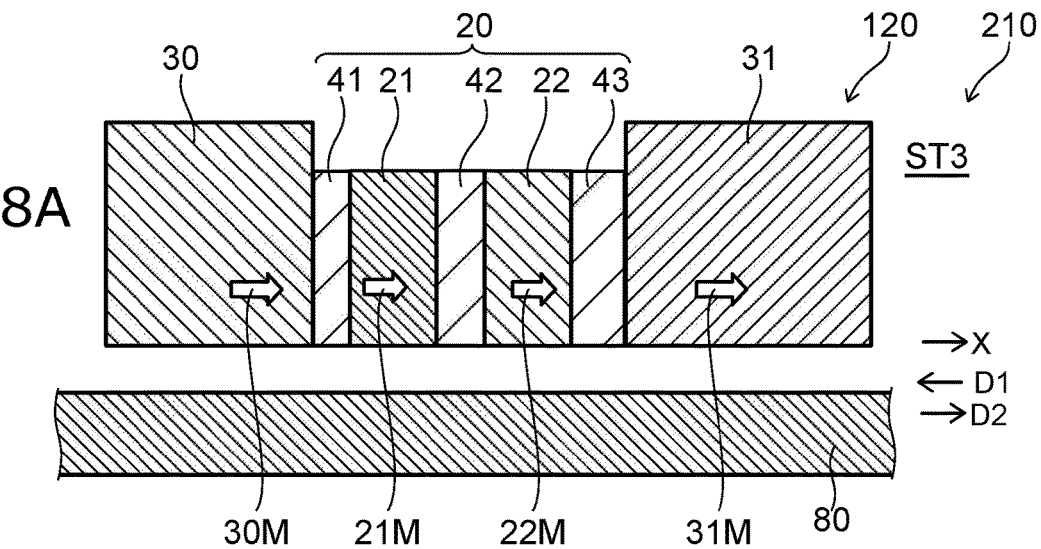
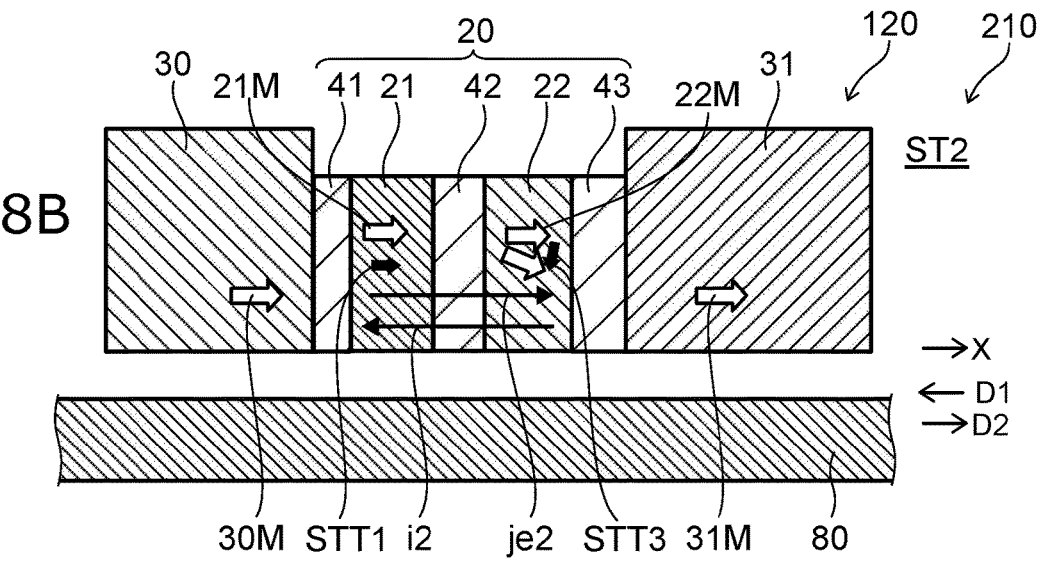
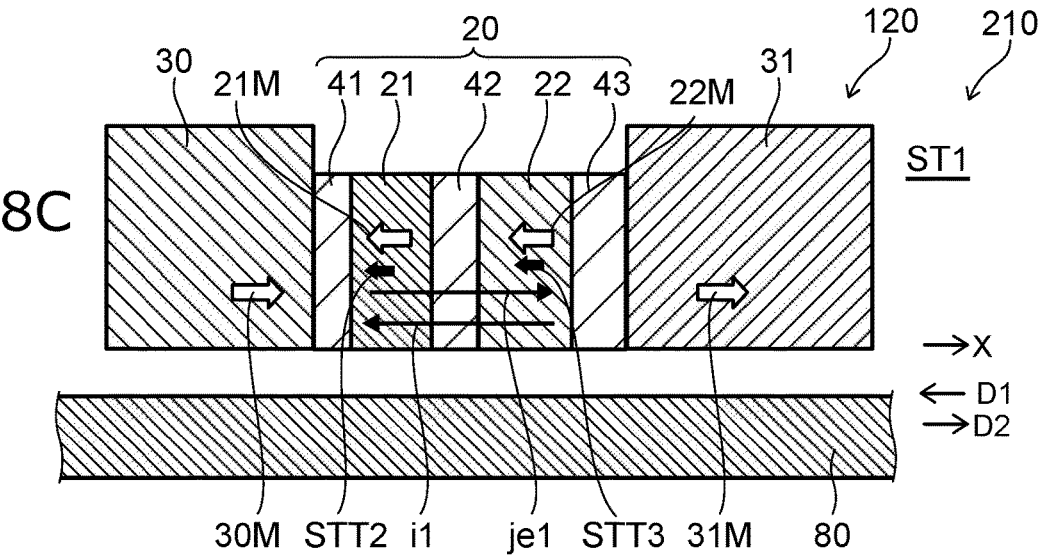

MAGNETIC HEAD AND MAGNETIC RECORDING DEVICE WITH STACKED BODY MATERIAL CONFIGURATIONS

CROSS-REFERENCE TO RELATED APPLICATIONS

This application is based upon and claims the benefit of priority from Japanese Patent Application No. 2019-202653, filed on Nov. 7, 2019, and Japanese Patent Application No. 2020-148037, filed on Sep. 3, 2020; the entire contents of which are incorporated herein by reference.

FIELD

Embodiments of the invention generally relate to a magnetic head and a magnetic recording device.

BACKGROUND

Information is recorded in a magnetic storage medium such as a HDD (Hard Disk Drive) or the like by using a magnetic head. It is desirable to increase the recording density of the magnetic head and the magnetic recording device.

BRIEF DESCRIPTION OF THE DRAWINGS

FIGS. 8A to 8C are schematic cross-sectional views illustrating a magnetic recording device according to a second embodiment;

DETAILED DESCRIPTION

Figure 1A:
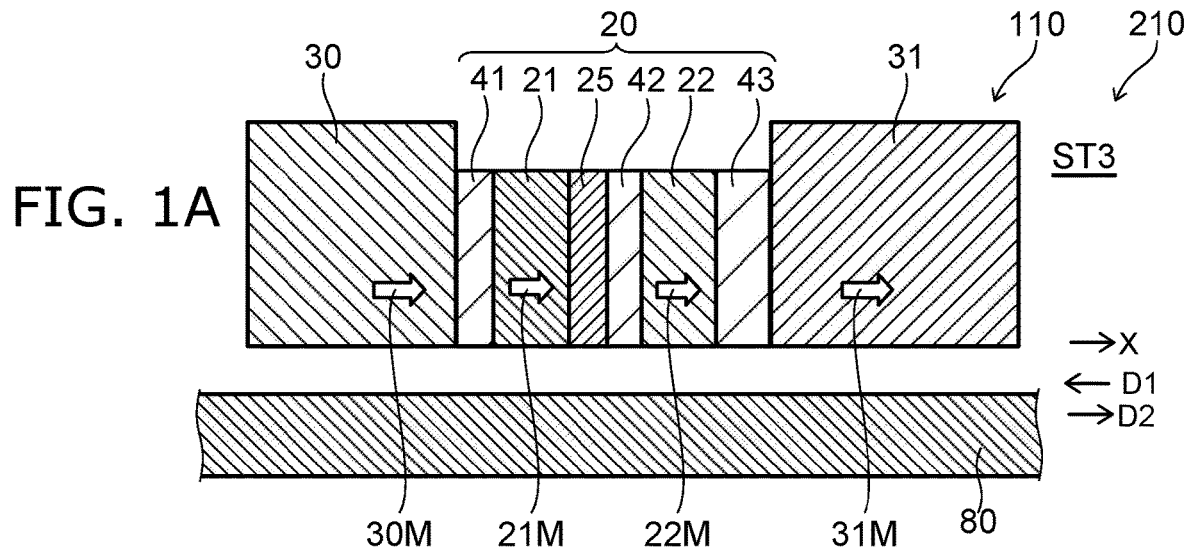
FIGS. 1A to 1C are schematic cross-sectional views illustrating a magnetic recording device according to a first embodiment.

According to one embodiment, a magnetic recording device includes a magnetic head, and an electrical circuit. The magnetic head includes a first magnetic pole, a second magnetic pole, and a stacked body provided between the first magnetic pole and the second magnetic pole. The stacked body includes a first nonmagnetic layer, a first magnetic layer provided between the first nonmagnetic layer and the second magnetic pole, a first layer provided between the first magnetic layer and the second magnetic pole, a second nonmagnetic layer provided between the first layer and the second magnetic pole, a second magnetic layer provided between the second nonmagnetic layer and the second magnetic pole, and a third nonmagnetic layer provided between the second magnetic layer and the second magnetic pole. The first magnetic layer includes at least one first element selected from the group consisting of Co, Fe, and Ni, and a concentration of the first element in the first magnetic layer is 50 atomic % or more. The second magnetic layer includes at least one second element selected from the group consisting of Fe, Ni, and Co, and at least one third element selected from the group consisting of Cr, V, Mn, Ti, and Sc. The first layer includes at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu. The electrical circuit supplies, to the stacked body, a first current having a first orientation from the second magnetic pole toward the first magnetic pole.

According to one embodiment, a magnetic head includes a first magnetic pole, a second magnetic pole; and a stacked body provided between the first magnetic pole and the second magnetic pole. The stacked body includes a first nonmagnetic layer, a first magnetic layer provided between the first nonmagnetic layer and the second magnetic pole, a first layer provided between the first magnetic layer and the second magnetic pole, a second nonmagnetic layer provided between the first layer and the second magnetic pole, a second magnetic layer provided between the second nonmagnetic layer and the second magnetic pole, and a third nonmagnetic layer provided between the second magnetic layer and the second magnetic pole. The first magnetic layer includes at least one first element selected from the group consisting of Co, Fe, and Ni, and a concentration of the first element in the first magnetic layer is 50 atomic % or more. The second magnetic layer includes at least one second element selected from the group consisting of Fe, Ni, and Co, and at least one third element selected from the group consisting of Cr, V, Mn, Ti, and Sc. The first layer includes at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu. A first current is supplied to the stacked body and has a first orientation from the second magnetic pole toward the first magnetic pole.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are

First Embodiment

Figure 1B:
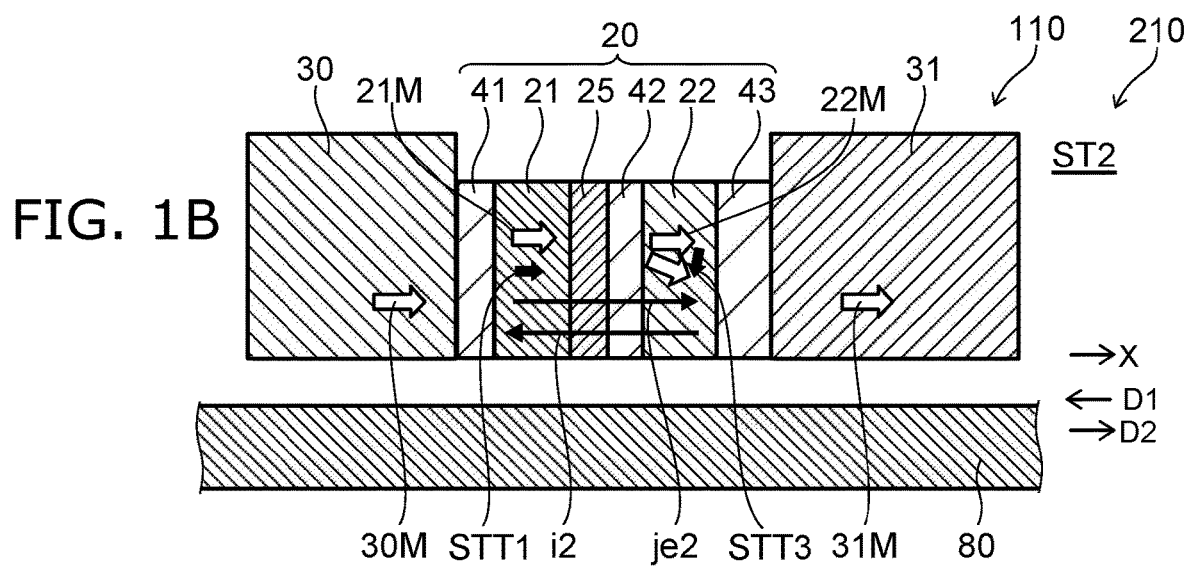
Figure 1C:
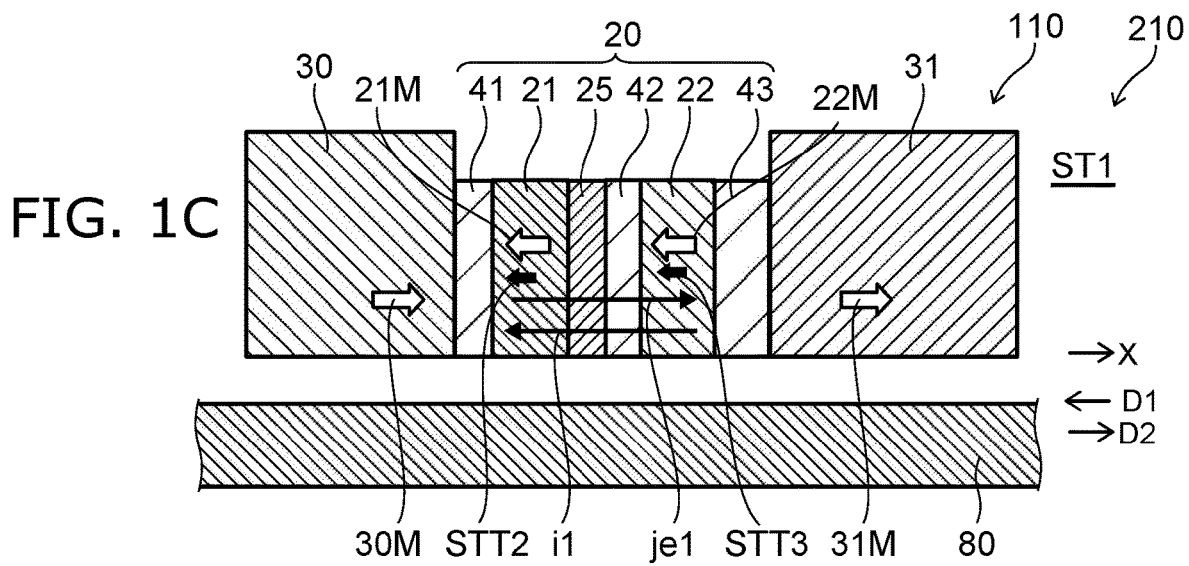

FIGS. 1A to 1C are schematic cross-sectional views illustrating a magnetic recording device according to a first embodiment.

As shown in FIG. 1A, the magnetic recording device 210 according to the embodiment includes a magnetic head 110 and a magnetic recording medium 80. Information is recorded in the magnetic recording medium 80 by the magnetic head 110. The magnetic recording medium 80 is, for example, a perpendicular recording medium. Examples of the magnetic recording medium 80 are described below.

As shown in FIG. 1A, the magnetic head 110 includes a first magnetic pole 30, a second magnetic pole 31, and a stacked body 20. The stacked body 20 is provided between the first magnetic pole 30 and the second magnetic pole 31.

In the example, the stacked body 20 includes a first nonmagnetic layer 41, a first magnetic layer 21, a first layer 25, a second nonmagnetic layer 42, a second magnetic layer 22, and a third nonmagnetic layer 43. Another magnetic layer (a third magnetic layer) also may be provided as described below.

The first magnetic layer 21 is provided between the first nonmagnetic layer 41 and the second magnetic pole 31. The first layer 25 is provided between the first magnetic layer 21 and the second magnetic pole 31. The second nonmagnetic layer 42 is provided between the first layer 25 and the second magnetic pole 31. The second magnetic layer 22 is provided between the second nonmagnetic layer 42 and the second magnetic pole 31. The third nonmagnetic layer 43 is provided between the second magnetic layer 22 and the second magnetic pole 31.

The first magnetic layer 21 includes at least one first element selected from the group consisting of Co, Fe, and Ni. The concentration of the first element in the first magnetic layer 21 is 50 atomic % or more. The first magnetic layer 21 includes, for example, an FeCo alloy or a NiFe alloy.

The second magnetic layer 22 includes at least one second element selected from the group consisting of Fe, Ni, and Co, and at least one third element selected from the group consisting of Cr, V, Mn, Ti, and Sc.

For example, the material of the second magnetic layer 22 is different from the material of the first magnetic layer 21. For example, the characteristics of the second magnetic layer 22 are different from the characteristics of the first magnetic layer 21. For example, the properties of the second magnetic layer 22 are different from the properties of the first magnetic layer 21. For example, the characteristics that relate to the polarization of the second magnetic layer 22 are different from the characteristics relating to the polarization of the first magnetic layer 21. For example, the first magnetic layer 21 has a positive polarization. The second magnetic layer 22 has a negative polarization.

The first layer 25 includes at least one selected from the group (hereinbelow, called a "first layer material group") consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu.

For example, the first nonmagnetic layer 41 includes at least one selected from the group consisting of Ta, Ru, Cr, and Cu. For example, the second nonmagnetic layer 42 includes at least one selected from the group consisting of Cu, Ag, Au, and Cr. The third nonmagnetic layer 43 includes at least one selected from the group consisting of Cu, Ag, and Au.

The first magnetic pole 30 is, for example, a major magnetic pole. For example, the second magnetic pole 31 is a shield (for example, a trailing shield). For example, the first magnetic pole 30 and the second magnetic pole 31 form a magnetic circuit. As described below, a coil is provided at the first magnetic pole 30 (and/or the second magnetic pole 31). A recording magnetic field that corresponds to a recording current flowing in the coil is generated from the first magnetic pole 30. At least a portion of the generated recording magnetic field is oriented toward the magnetic recording medium 80. At least a portion of the recording magnetic field is applied to the magnetic recording medium 80. The orientation of the magnetization of the portion of the magnetic recording medium 80 to which the recording magnetic field is applied is controlled by the recording magnetic field. Thereby, information that corresponds to the orientation of the recording magnetic field is recorded in the magnetic recording medium 80. For example, at least a portion of the recording magnetic field is oriented toward the second magnetic pole 31 after being oriented toward the magnetic recording medium 80.

The direction from the first magnetic pole 30 toward the second magnetic pole 31 is taken as an X-axis direction. The X-axis direction is, for example, the down-track direction.

A current can be supplied to the stacked body 20. For example, as described below, a current is supplied to the stacked body 20 via the first magnetic pole 30 and the second magnetic pole 31. The current is supplied from an electrical circuit 20D described below (referring to FIG. 12).

FIG. 1A corresponds to a state (a third state ST3) in which a current is not supplied to the stacked body 20. FIG. 1C corresponds to a first state ST1. A first current i1 is supplied to the stacked body 20 in the first state ST1. FIG. 1B corresponds to a second state ST2. A second current i2 is supplied to the stacked body 20 in the second state ST2. The second current i2 is less than the first current i1. For example, the first current i1 is supplied from the electrical circuit 20D described below (referring to FIG. 12). In the example of FIGS. 1A to 1C, the magnetization of the first magnetic pole 30 and the magnetization of the second magnetic pole 31 are fixed in the X-axis direction by the current flowing in the coil. The second current i2 is supplied to the stacked body 20 in this state.

For example, the first current i1 is a current that is sufficient to reverse a first magnetization 21M of the first magnetic layer 21 and a second magnetization 22M of the second magnetic layer 22.

In the example, the first current i1 has a first orientation D1 from the second magnetic pole 31 toward the first magnetic pole 30. The second current i2 also has the first orientation D1 from the second magnetic pole 31 toward the first magnetic pole 30. The first magnetization 21M of the first magnetic layer 21 and the second magnetization 22M of the second magnetic layer 22 are reversed by supplying a large first current i1 to the stacked body 20.

A first electron current je1 flows in the stacked body 20 when the first current i1 flows in the stacked body 20. The orientation of the first electron current je1 is the reverse of the orientation of the first current i1. A second electron current je2 flows in the stacked body 20 when the second current i2 flows in the stacked body 20. The orientation of the second electron current je2 is the reverse of the orientation of the second current i2.

In the first state ST1, the first magnetization 21M and the second magnetization 22M have reverse components of the orientation of a magnetization 30M of the first magnetic pole 30 and the orientation of a magnetization 31M of the second magnetic pole 31. Thereby, the recording magnetic field that is generated from the first magnetic pole 30 does not easily pass through the first magnetic layer 21 and the second magnetic layer 22 (i.e., the stacked body 20). Thereby, much of the recording magnetic field generated from the first magnetic pole 30 is easily oriented toward the magnetic recording medium 80. The recording magnetic field is efficiently applied to the magnetic recording medium 80.

For example, when the distance between the first magnetic pole 30 and the second magnetic pole 31 is reduced to increase the recording density, the recording magnetic field that is generated from the first magnetic pole 30 easily enters the second magnetic pole 31 without being oriented toward the magnetic recording medium 80. At this time, in the embodiment, the recording magnetic field is effectively oriented toward the magnetic recording medium 80 even when the distance between the first magnetic pole 30 and the second magnetic pole 31 is short because the first magnetization 21M and the second magnetization 22M are reversed. The recording magnetic field can be effectively applied to the magnetic recording medium 80 even when the distance between the first magnetic pole 30 and the second magnetic pole 31 is short. Thereby, a magnetic head and a magnetic recording device can be provided in which the recording density can be increased.

In the embodiment, for example, the stacked body 20 does not generate an alternating current magnetic field. Or, the frequency of the alternating current magnetic field generated from the stacked body 20 is greater than the magnetic resonant frequency of the magnetic recording medium.

On the other hand, there is a reference example of MAMR (Microwave Assisted Magnetic Recording). In the reference example, a high frequency magnetic field is generated from a stacked body including a magnetic layer. The high frequency magnetic field is applied to a portion of the magnetic recording medium 80, magnetic resonance is generated in a portion of the magnetic recording medium 80, and the orientation of the magnetization of the magnetic recording medium 80 changes easily. In the reference example, the frequency of the high frequency magnetic field generated from the stacked body is not more than the magnetic resonant frequency of the magnetic recording medium 80. Thereby, the orientation of the magnetization of the magnetic recording medium 80 changes easily due to the generation of the magnetic resonance.

Conversely, in the embodiment, the stacked body 20 does not generate an alternating current magnetic field. Or, the frequency of the alternating current magnetic field generated from the stacked body 20 is greater than the magnetic resonant frequency of the magnetic recording medium. In the embodiment, unlike MAMR, the first magnetization 21M of the first magnetic layer 21 and the second magnetization 22M of the second magnetic layer 22 reverse.

An example of changes of the magnetizations of the embodiment will now be described.

As shown in FIG. 1A, the magnetization 30M, the first magnetization 21M, the second magnetization 22M, and the magnetization 31M have the same orientation (e.g., a second orientation D2) in the third state ST3 (the initial state) in which a current is not supplied.

As shown in FIG. 1B, the second magnetization 22M of the second magnetic layer 22 is affected by a spin-transfer torque STT3 from the second magnetic pole 31 toward the second magnetic layer 22 in the second state ST2 in which a small second current i2 (the second electron current jet) is supplied to the stacked body 20. On the other hand, for example, because the first layer 25 is provided, a spin-transfer torque STT1 from the first magnetic layer 21 is attenuated by the first layer 25, and the effects of the spin-transfer torque STT1 on the second magnetic layer 22 are suppressed. Thereby, the second magnetization 22M starts to change from the initial state. On the other hand, the first magnetization 21M of the first magnetic layer 21 remains in the initial state.

As shown in FIG. 1C, in the first state ST1 in which a sufficiently large first current i1 (the first electron current je1) is supplied to the stacked body 20, for example, the second magnetization 22M of the second magnetic layer 22 is affected by the spin-transfer torque STT3 from the second magnetic pole 31, and in the first state ST1, the second magnetization 22M is rotated toward the reverse direction of the magnetization 30M of the first magnetic pole 30 and the magnetization 31M of the second magnetic pole 31, and the first orientation D1 component of the second magnetization 22M increases. In one example, the second magnetization 22M is reversed from the initial state. When the rotation angle of the second magnetization 22M exceeds 90 degrees, the first magnetization 21M of the first magnetic layer 21 is affected by a spin-transfer torque STT2 from the second magnetic layer 22 and is reversed. Thus, the first magnetization 21M of the first magnetic layer 21 and the second magnetization 22M of the second magnetic layer 22 are reversed from the initial state by the flow of the large first current i1.

The reversals of the first and second magnetizations 21M and 22M due to the spin-transfer torque occur in a short period of time that is a nanosecond or less following the reversals of the first magnetic poles. Therefore, the recording magnetic field can be stably and effectively oriented toward the magnetic recording medium 80 even when the distance between the first magnetic pole 30 and the second magnetic pole 31 is short and a fine recording pattern is recorded. A magnetic head and a magnetic recording device can be provided in which the recording density can be increased.

An example of the changes of the magnetizations of a reference example will now be described.

Figure 2A:
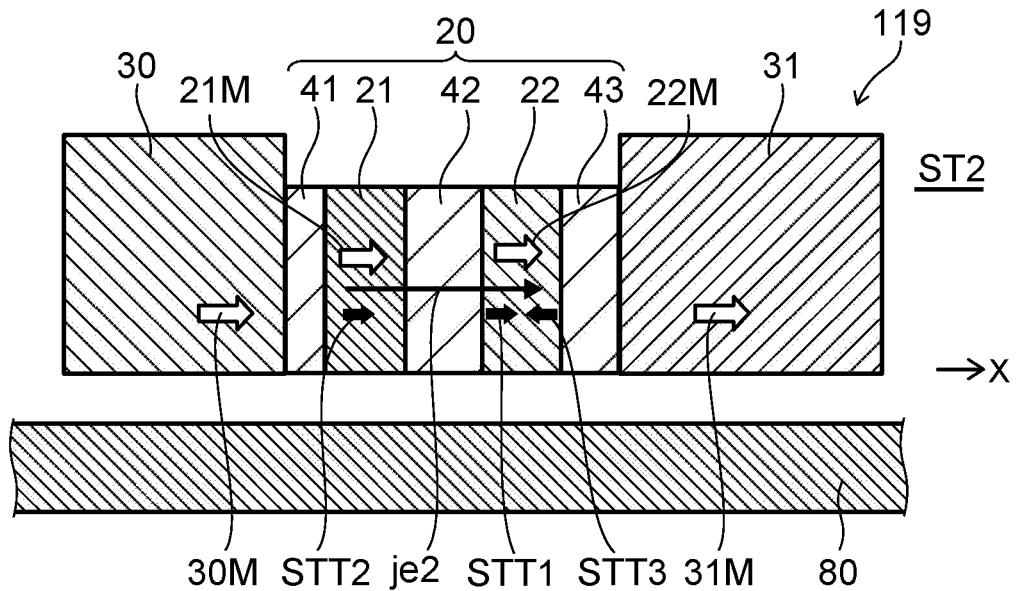
FIGS. 2A and 2B are schematic cross-sectional views illustrating a magnetic recording device according to the reference example.
Figure 2B:
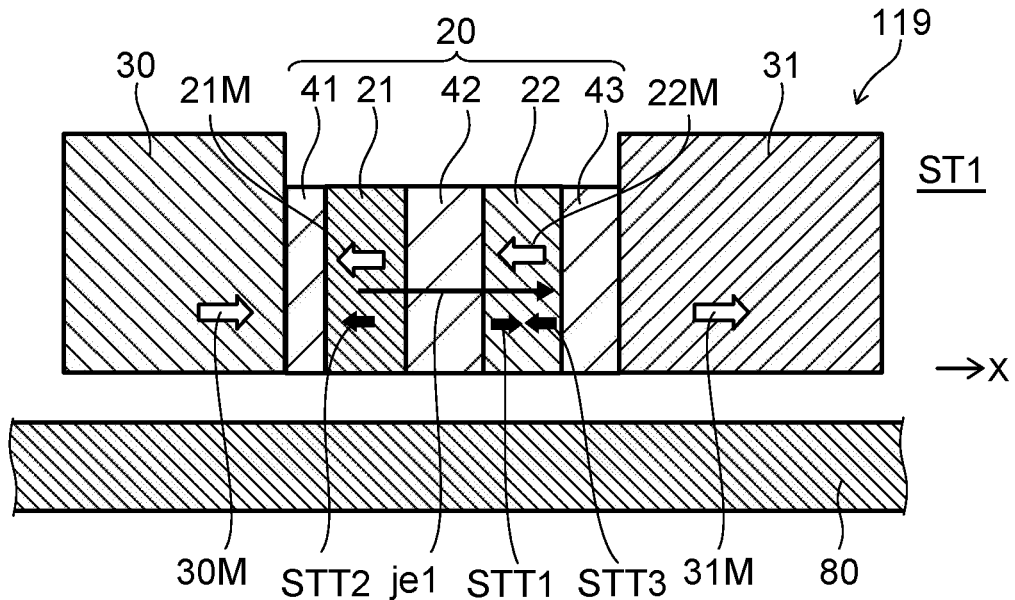

FIGS. 2A and 2B are schematic cross-sectional views illustrating a magnetic recording device according to the reference example.

As shown in FIGS. 2A and 2B, the first layer 25 is not provided in the magnetic head 119 according to the reference example. FIG. 2A illustrates a case where the first magnetic layer 21 that is included in the magnetic head 119 has a positive polarization. FIG. 2B illustrates a case where the first magnetic layer 21 that is included in the magnetic head 119 has a negative polarization.

As shown in FIG. 2A, both the spin-transfer torque STT3 from the second magnetic pole 31 and the spin-transfer torque STT1 from the first magnetic layer 21 act on the second magnetic layer 22 in the second state ST2 in which the small second current i2 (the second electron current jet) flows in the stacked body 20. The polarity of the polarization of the first magnetic layer 21 and the polarity of the polarization of the second magnetic pole 31 that apply spin torque are positive; therefore, the orientation of the spin-transfer torque STT3 and the orientation of the spin-transfer torque STT1 from the first magnetic layer 21 are mutuallyreversed and therefore cancel each other. Therefore, the second magnetization 22M of the second magnetic layer 22 is not easily reversed.

When the polarity of the first magnetic layer 21 is negative, the polarity of the polarization of the first magnetic layer 21 is the reverse of the polarity of the polarization of the second magnetic pole 31; therefore, the spin-transfer torques toward the second magnetic layer 22 are added, and the reversal of the second magnetic layer 22 is accelerated. However, as shown in FIG. 2B, in the first state ST1 in which the large first current i1 (the first electron current je1) is supplied to the stacked body 20, the rotation angle of the magnetization 22M of the second magnetic layer 22 exceeds 90 degrees; therefore, the direction of the spin-transfer torque STT2 from the second magnetic layer 22 is reversed, and the magnetization 21M of the first magnetic layer 21 is reversed. As a result, the spin-transfer torque STT3 from the second magnetic pole 31 and the spin-transfer torque STT1 from the first magnetic layer 21 are the reverse of each other. Thus, regardless of the polarity of the polarization of the first magnetic layer 21 in the reference example, the first magnetization 21M of the first magnetic layer 21 and the second magnetization 22M of the second magnetic layer 22 are not easily reversed. The current density that is necessary in the reference example is too high to easily ensure the reliability.

Conversely, in the magnetic head 110 according to the embodiment, the obstruction of the spin-transfer torque STT2 from the second magnetic layer 22 is suppressed. The reversals of the first and second magnetizations 21M and 22M occur at a low current density. Thereby, a magnetic head and a magnetic recording device can be provided in which the recording density can be increased.

In the embodiment as shown in FIG. 1C, when the first current i1 is supplied to the stacked body 20, for example, the first magnetization 21M of the first magnetic layer 21 has a component of the first orientation D1. When the first current i1 is supplied to the stacked body 20, the second magnetization 22M of the second magnetic layer 22 has a component of the first orientation D1.

As shown in FIG. 1B, when the second current i2 that has the first orientation D1 is supplied to the stacked body 20, the first magnetization 21M has a component in the second orientation D2, which is from the first magnetic pole 30 toward the second magnetic pole 31. The second current i2 is less than the first current i1. When the second current i2 is supplied to the stacked body 20, the second magnetization 22M has a component of the second orientation D2. The second orientation D2 component of the second magnetization 22M is less than the second orientation D2 component of the first magnetization 21M.

Figure 3A:
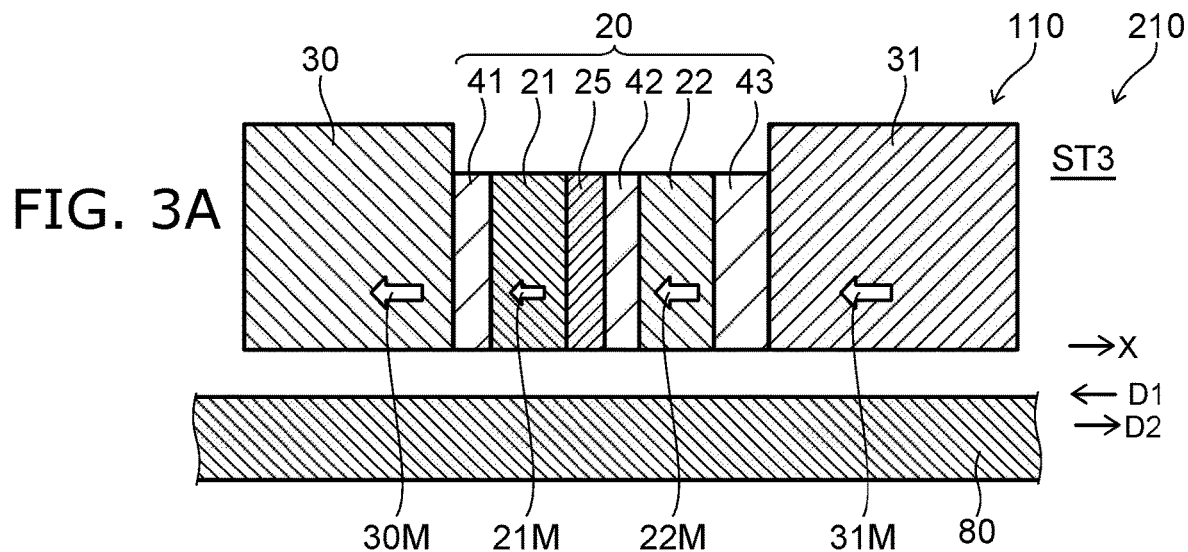
FIGS. 3A to 3C are schematic cross-sectional views illustrating a magnetic recording device according to the first embodiment.
Figure 3B:
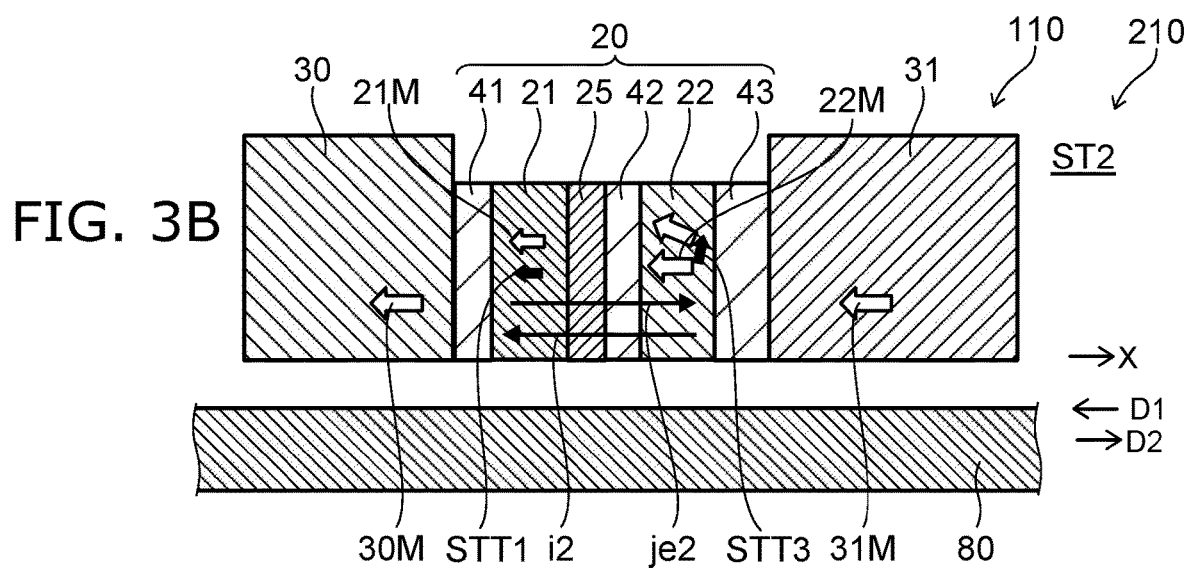
Figure 3C:
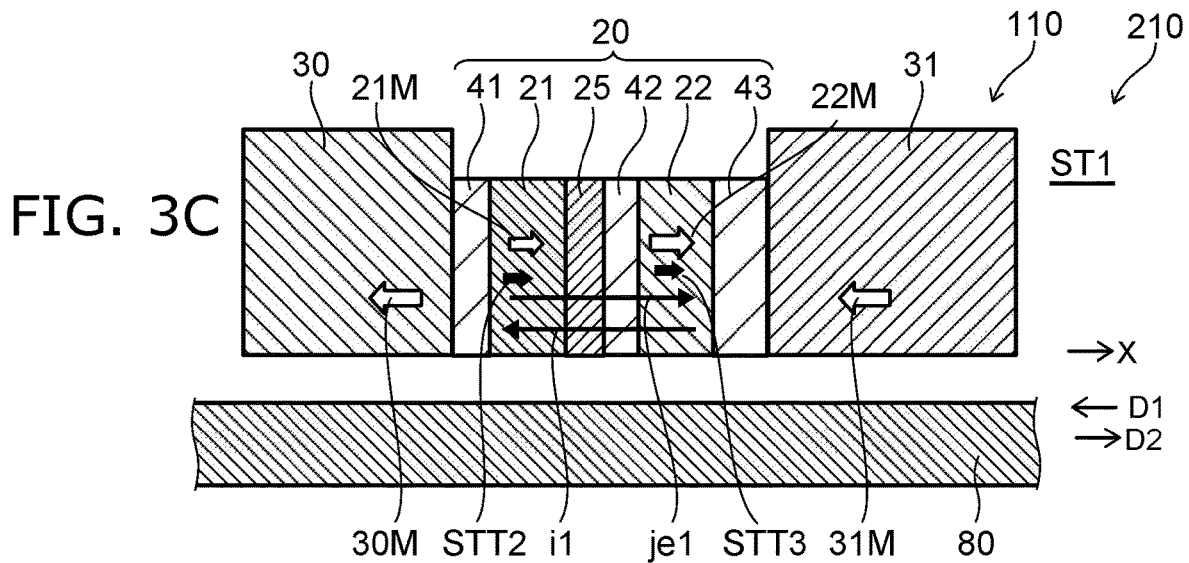

FIGS. 3A to 3C are schematic cross-sectional views illustrating a magnetic recording device according to the first embodiment.

As shown in FIGS. 3A to 3C, in one period, the orientation of the magnetization 30M of the first magnetic pole 30 and the orientation of the magnetization 31M of the second magnetic pole 31 are the reverse of the states illustrated in FIGS. 1A to 1C.

As shown in FIG. 3C, the magnetization 30M of the first magnetic pole 30 has a component of the first orientation D1. When the first current i1 is supplied to the stacked body 20, the first magnetization 21M of the first magnetic layer 21 has a component of the second orientation D2. When the first current i1 is supplied to the stacked body 20, the second magnetization 22M of the second magnetic layer 22 has a component of the second orientation D2.

As shown in FIGS. 3A and 3B, the first magnetization 21M has a component of the first orientation D1 when a current is not supplied to the stacked body 20 or when the second current i2 is supplied to the stacked body 20. The second magnetization 22M has a component of the first orientation D1 when a current is not supplied to the stacked body 20 or when the second current i2 is supplied to the stacked body 20. Thus, even when the orientation of the magnetization 30M of the first magnetic pole 30 is the reverse of the state illustrated in FIGS. 1A to 1C, the first magnetization 21M and the second magnetization 22M are reversed from the initial state (the third state ST3) in the first state ST1 in which the large first current i1 is supplied.

Examples of characteristics of the magnetic head according to the embodiment will now be described.

Figure 4:
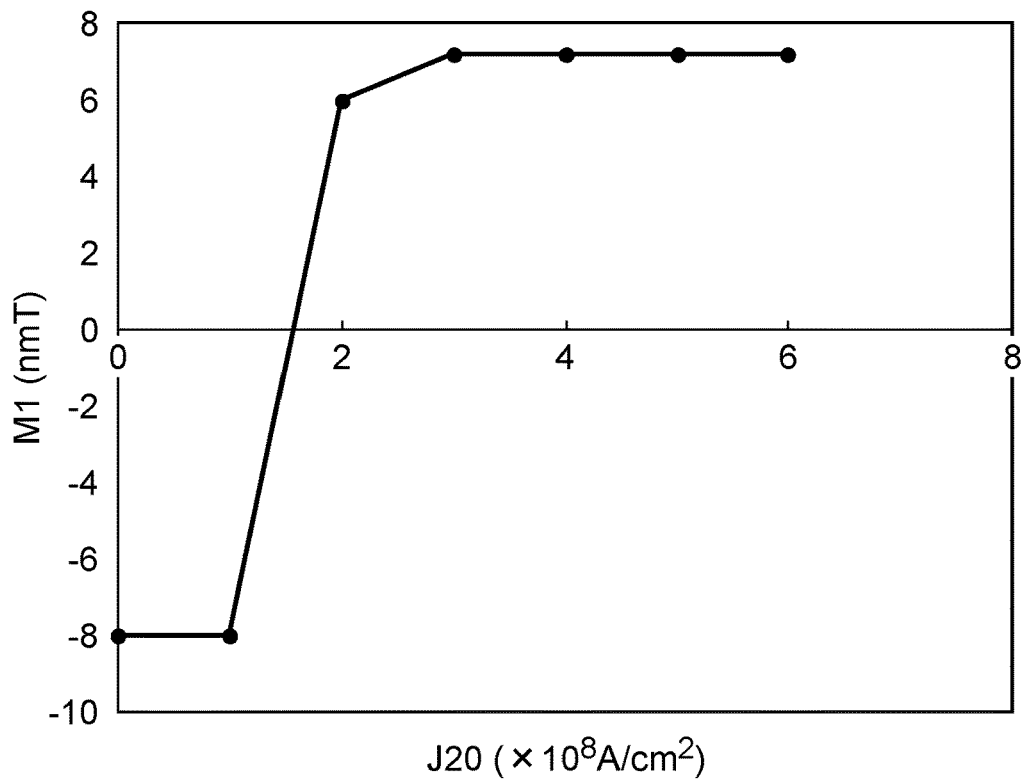
FIG. 4 is a graph illustrating a characteristic of the magnetic head according to the embodiment.

FIG. 4 is a graph illustrating a characteristic of the magnetic head according to the embodiment.

FIG. 4 illustrates simulation results of a characteristic of the magnetic head 110. The horizontal axis of FIG. 4 is a current density 320 flowing in the stacked body 20. The vertical axis of FIG. 4 is a parameter M1. The parameter M1 is the first orientation D1 component of the sum of the magnetic thickness of the first magnetic layer 21 and the magnetic thickness of the second magnetic layer 22. The magnetic thickness of the first magnetic layer 21 is the product of the thickness (the length along the X-axis direction) of the first magnetic layer 21 and the saturation magnetization of the first magnetic layer 21. The magnetic thickness of the second magnetic layer 22 is the product of the thickness (the length along the X-axis direction) of the second magnetic layer 22 and the saturation magnetization of the second magnetic layer 22.

In the model of the simulation, the magnetic thickness of the first magnetic layer 21 is 4 nmT. The magnetic thickness of the second magnetic layer 22 is 4 nmT. The magnetic field (the gap magnetic field) between the first magnetic pole 30 and the second magnetic pole 31 is 15 kOe. The spin-transfer torque STT1 from the first magnetic layer 21 toward the second magnetic layer 22 is reduced by the first layer 25 and is 0 in the example. The time that the current is supplied to the stacked body 20 is a sufficiently long time that is 1 nanosecond or more.

As shown in FIG. 4, the parameter M1 is negative when the current density 320 is low (e.g., $1 \times 10^8$ A/cm$^2$ or less). The parameter M1 becomes positive as the current density 320 increases. The parameter M1 is positive when the current density 320 is high (e.g., $2 \times 10^8$ A/cm$^2$ or more). The polarity of the parameter M1 reverses in the range in which the current density 320 is $1 \times 10^8$ A/cm$^2$ to $2 \times 10^8$ A/cm$^2$. The reversal of the polarity of the parameter M1 corresponds to the magnetization of the stacked body 20 changing from the same orientation as the magnetization 30M of the first magnetic pole 30 to the reverse orientation of the magnetization 30M of the first magnetic pole 30.

When the current density 320 is 0, the first magnetization 21M of the first magnetic layer 21 and the second magnetization 22M of the second magnetic layer 22 have the same orientation as the magnetization 30M of the first magnetic pole 30, and the parameter M1 is about −8 nmT. When the current density 320 is $2 \times 10^8$ A/cm$^2$ or more, the parameter M1 saturates at about 7 nmT.

The magnetization of the stacked body 20 substantially can be reversed to the reverse orientation of the magnetization 30M of the first magnetic pole 30. According to this change, the action of the stacked body 20 on the recording magnetic field toward the magnetic recording medium 80 changes from negative to positive, and the recording capacity increases.

Figure 5:
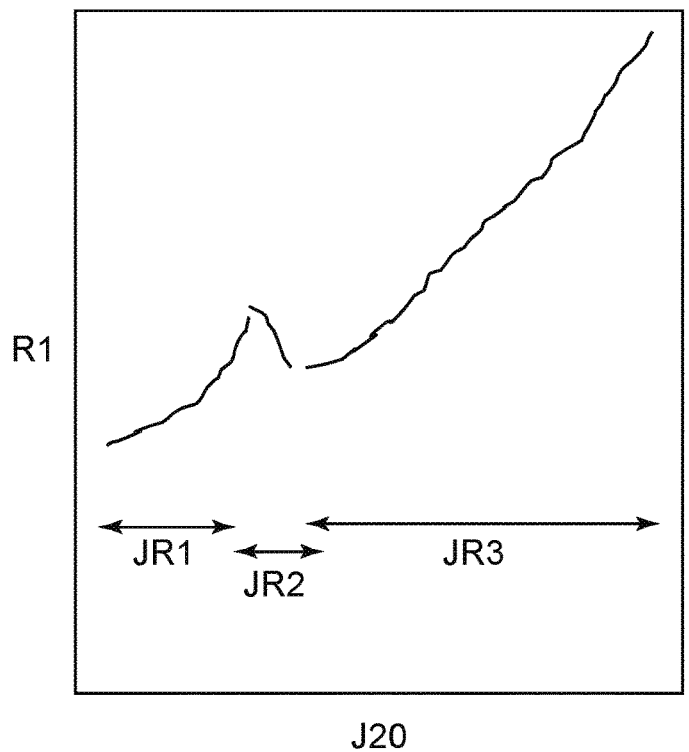
FIG. 5 is a graph illustrating a characteristic of the magnetic head according to the embodiment.

FIG. 5 is a graph illustrating a characteristic of the magnetic head according to the embodiment.

FIG. 5 corresponds to a characteristic in which the relationship between the current density 320 and the parameter M1 (the magnetization direction of the stacked body 20) illustrated in FIG. 4 is converted into a relationship between the current density 320 and an electrical resistance R1. The horizontal axis of FIG. 5 is the current density 320. The vertical axis of FIG. 5 is the electrical resistance R1.

As shown in FIG. 5, the current density 320 has a first range JR1, a second range JR2, and a third range JR3. The current density 320 in the second range JR2 is greater than the current density 320 in the first range JR1. The current density 320 in the third range JR3 is greater than the current density 320 in the second range JR2. In the first and third ranges JR1 and JR3, the electrical resistance R1 parabolically increases as the current density 320 increases. This is an effect of heat generation. In the second range JR2, the electrical resistance R1 decreases as the current density 320 increases. The decrease of the electrical resistance R1 is caused by a negative magnetoresistance effect generated between the second magnetic layer 22 that has a negative polarization and the second magnetic pole 31 that has a positive polarization. The decrease of the electrical resistance R1 corresponds to the reversal of the second magnetization 22M of the second magnetic layer 22.

It can be seen from FIG. 5 that the change rate (the gradient) of the electrical resistance R1 with respect to the change of the current density 320 is positive when the current density 320 is in the first range JR1. The change rate is negative when the current density 320 is in the second range JR2. The change rate is positive when the current density 320 is in the third range JR3. The second range JR2 is between the first range JR1 and the third range JR3.

The first range JR1 corresponds to the second state ST2 illustrated in FIG. 1B. For example, the third range JR3 corresponds to the first state ST1 illustrated in FIG. 1C. The first magnetization 21M of the first magnetic layer 21 and the magnetization 22M of the second magnetic layer 22 reverse when the current density 320 is in the second range JR2.

For example, when the current density 320 is the first range JR1, the first magnetization 21M of the first magnetic layer 21 and the magnetization 22M of the second magnetic layer 22 have components in the orientation of the magnetization 30M of the first magnetic pole 30. For example, when the current density 320 is in the third range JR3, the first magnetization 21M of the first magnetic layer 21 and the magnetization 22M of the second magnetic layer 22 reverse and have reverse components of the orientation of the magnetization 30M of the first magnetic pole 30.

The electrical circuit 20D (referring to FIG. 12) supplies, to the stacked body 20, the first current i1 of the current density 320 that is within the third range JR3. Thereby, the first magnetization 21M of the first magnetic layer 21 and the second magnetization 22M of the second magnetic layer 22 have reverse components of the orientation of the magnetization 30M of the first magnetic pole 30. Thereby, the recording magnetic field from the first magnetic pole 30 is easily oriented toward the magnetic recording medium 80. Thereby, the recording magnetic field is efficiently applied to the magnetic recording medium 80. A magnetic head and a magnetic recording device can be provided in which the recording density can be increased.

The current density that corresponds to the first current i1 described above corresponds to the current density 320 that is within the third range JR3. The current density that corresponds to the second current i2 described above corresponds to the current density 320 that is within the first range JR1.

In the magnetic head 110, for example, the first layer 25 contacts the first magnetic layer 21 and the second nonmagnetic layer 42. For example, the second nonmagnetic layer 42 contacts the first layer 25 and the second magnetic layer 22.

Figure 6:
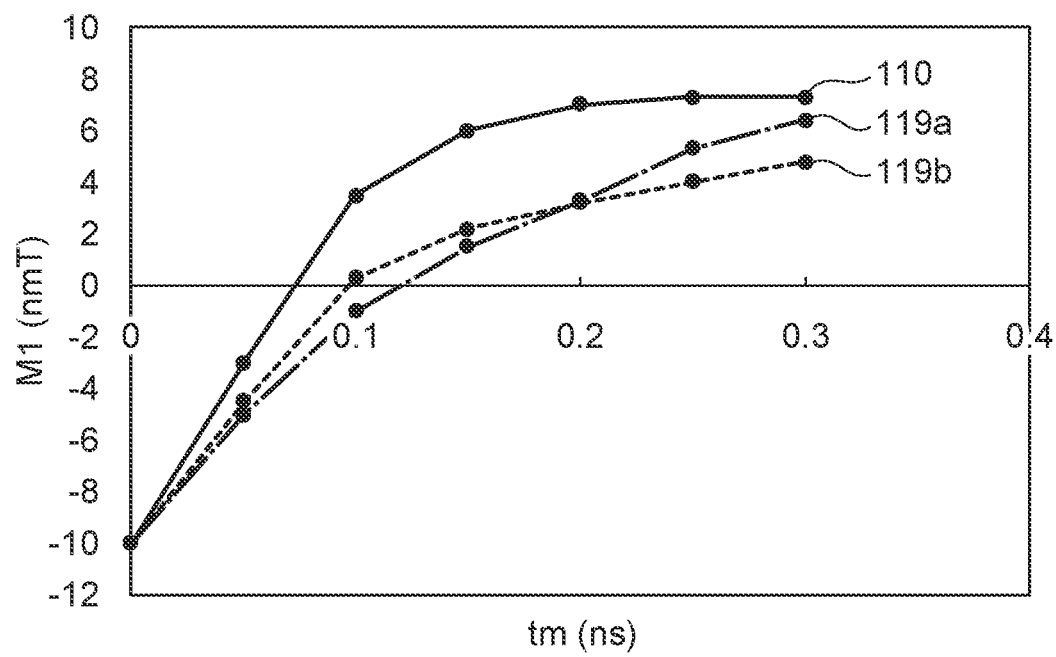
FIG. 6 is a graph illustrating characteristics of magnetic heads.

FIG. 6 is a graph illustrating characteristics of magnetic heads.

FIG. 6 illustrates simulation results of dynamic characteristics of magnetic heads.

The horizontal axis of FIG. 6 is a time tm. The time tm is zero directly after the magnetization 30M of the first magnetic pole 30 and the magnetization 31M of the second magnetic pole 31 reverse. The vertical axis of FIG. 6 is the parameter M1 described above. In FIG. 6, the current density 320 is $2 \times 10^8$ A/cm$^2$.

FIG. 6 illustrates a characteristic of the magnetic head 110 according to the embodiment, a characteristic of a magnetic head 119a, and a characteristic of a magnetic head 119b.

In the magnetic head 110, the magnetic thickness of the first magnetic layer 21 is 4 nmT. The magnetic thickness of the second magnetic layer 22 is 6 nmT. The magnetic field (the gap magnetic field) between the first magnetic pole 30 and the second magnetic pole 31 is 15 kOe. The value of the spin-transfer torque STT3 corresponds to the value when FeCo having a positive polarization is used as the second magnetic pole 31.

The first layer 25 is not provided in the magnetic head 119a. In the magnetic head 119a, the spin-transfer torque STT1 from the first magnetic layer 21 toward the second magnetic layer 22 is the same value as the spin-transfer torque STT3 from the second magnetic pole 31 toward the second magnetic layer 22. The magnetic thickness of the first magnetic layer 21 and the magnetic thickness of the second magnetic layer 22 of the magnetic head 119a are respectively equal to the magnetic thickness of the first magnetic layer 21 and the magnetic thickness of the second magnetic layer 22 of the magnetic head 110. Otherwise, the conditions of the magnetic head 119a are the same as the conditions of the magnetic head 110.

The first magnetic layer 21, the first layer 25, and the second nonmagnetic layer 42 are not provided in the stacked body 20 of the magnetic head 119b. The first nonmagnetic layer 41 and the second magnetic layer 22 are provided in the magnetic head 119b. The magnetic thickness of the second magnetic layer 22 of the magnetic head 119b is 10 nmT. The magnetic thickness of the second magnetic layer 22 of the magnetic head 119b is equal to the total magnetic thickness of the first magnetic layer 21 and the second magnetic layer 22 of the magnetic heads 110 and 119a. The conditions of the magnetic head 119b are the same as the conditions of the magnetic head 110. The magnetization 22M of the second magnetic layer 22 is reversed by the spin-transfer torque STT3 from the second magnetic pole 31 in the magnetic head 119b.

As shown in FIG. 6, the time tm for the parameter M1 to change from negative to positive in the magnetic head 110 is less than the time tm for the parameter M1 to change from negative to positive in the magnetic head 119a. The time tm for the parameter M1 to change from negative to positive in the magnetic head 110 is less than the time tm for the parameter M1 to change from negative to positive in the magnetic head 119b. The magnetization reversal of a large magnetic thickness is obtained in a short period of time in the magnetic head 110. In the embodiment, the BER (bit error rate) can be improved because a large magnetic thickness can be quickly reversed.

Figure 7:
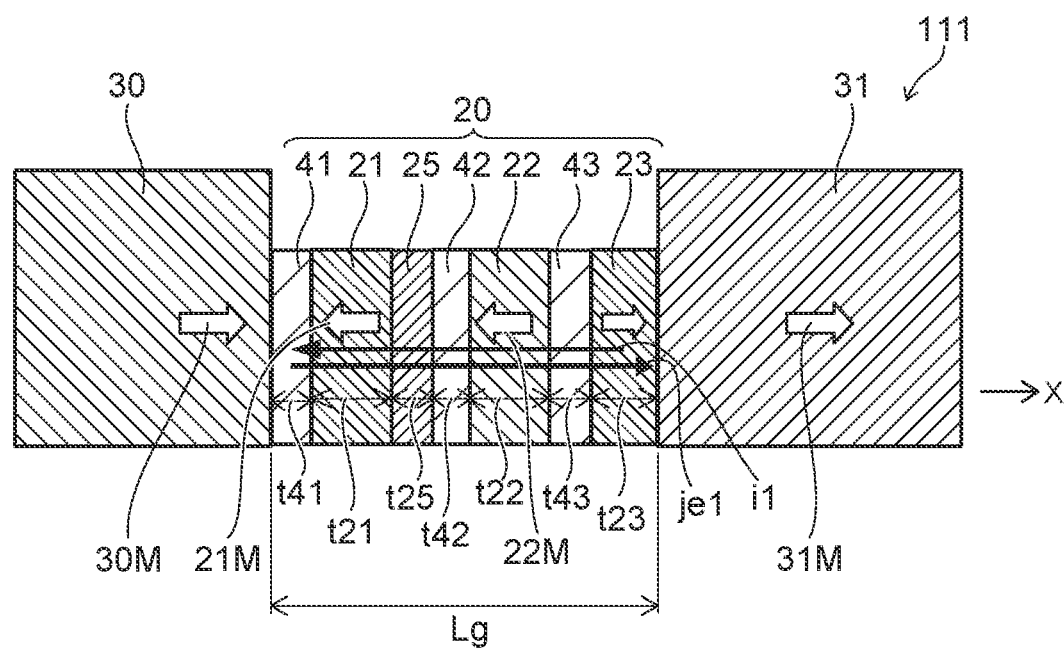
FIG. 7 is a schematic cross-sectional view illustrating a magnetic recording device according to the first embodiment.

FIG. 7 is a schematic cross-sectional view illustrating a magnetic recording device according to the first embodiment.

The magnetic recording device 210 according to the embodiment includes a magnetic head 111 shown in FIG. 7 and the magnetic recording medium 80 (referring to FIG. 1A). In the magnetic head 111, the stacked body 20 may include a third magnetic layer 23 in addition to the first nonmagnetic layer 41, the first magnetic layer 21, the first layer 25, the second nonmagnetic layer 42, the second magnetic layer 22, and the third nonmagnetic layer 43.

The third magnetic layer 23 is provided between the third nonmagnetic layer 43 and the second magnetic pole 31. The third magnetic layer 23 includes at least one fourth element selected from the group consisting of Co, Fe, and Ni. The concentration of the fourth element in the third magnetic layer 23 is 50 atomic % or more. For example, the third magnetic layer 23 has a positive polarization.

When the third magnetic layer 23 is provided, the spin-transfer torque STT3 described in reference to FIGS. 1B, 1C, 3B, and 3C is supplied from the third magnetic layer 23 to the second magnetic layer 22. For example, the third magnetic layer 23 has a function of supplying the spin-transfer torque of the second magnetic pole 31.

Even when the third magnetic layer 23 is provided, the first magnetization 21M of the first magnetic layer 21 and the second magnetization 22M of the second magnetic layer 22 can be stably and efficiently reversed.

As shown in FIG. 7, the first nonmagnetic layer 41, the first magnetic layer 21, the first layer 25, the second nonmagnetic layer 42, the second magnetic layer 22, the third nonmagnetic layer 43, and the third magnetic layer 23 respectively have a thickness t41, a thickness t21, a thickness t25, a thickness t42, a thickness t22, a thickness t43, and a thickness t23. These thicknesses are lengths along the stacking direction of the stacked body 20 (e.g., the X-axis direction).

In the magnetic heads 110 and 111, it is favorable for the thickness t41 of the first nonmagnetic layer 41 to be, for example, not less than 1 nm and not more than 6 nm. By setting the thickness t41 to be 1 nm or more, exchange coupling between the first magnetic pole 30 and the first magnetic layer 21 can be suppressed. The first magnetization 21M of the first magnetic layer 21 is easily reversed thereby. By setting the thickness t41 to be 6 nm or less, a distance Lg (the recording gap) between the first magnetic pole 30 and the second magnetic pole 31 can be prevented from becoming excessively long.

In the magnetic heads 110 and 111, it is favorable for the thickness t42 of the second nonmagnetic layer 42 to be, for example, not less than 1 nm and not more than 4 nm. By setting the thickness t42 to be 1 nm or more, exchange coupling between the first magnetic layer 21 and the second magnetic layer 22 can be suppressed. The first magnetization 21M of the first magnetic layer 21 and the second magnetization 22M of the second magnetic layer 22 are more easily reversed thereby. By setting the thickness t42 to be 4 nm or less, the distance Lg (the recording gap) can be prevented from becoming excessively long.

In the magnetic heads 110 and 111, it is favorable for the thickness t43 of the third nonmagnetic layer 43 to be, for example, not less than 1 nm and not more than 4 nm. By setting the thickness t43 to be 1 nm or more, exchange coupling between the second magnetic layer 22 and the third magnetic layer 23 (or the second magnetic layer 22 and the second magnetic pole 31) can be suppressed. The second magnetization 22M of the second magnetic layer 22 is more easily reversed thereby. By setting the thickness t43 to be 4 nm or less, the distance Lg (the recording gap) can be prevented from becoming excessively long.

In the magnetic heads 110 and 111, it is favorable for the product (the magnetic thickness) of a saturation magnetization Ms of the first magnetic layer 21 and the thickness t21 of the first magnetic layer 21 to be not less than 1 nmT and not more than 6 nmT. By setting the magnetic thickness to be not less than 1 nmT, the bit error rate (BER) is effectively improved. By setting the magnetic thickness to be 6 nmT or less, for example, a fast magnetization reversal is obtained by a practical current density 320 at which the reliability can be ensured. The BER can be improved.

In the magnetic heads 110 and 111, it is favorable for the product (the magnetic thickness) of the saturation magnetization Ms of the second magnetic layer 22 and the thickness t22 of the second magnetic layer 22 to be not less than 1 nmT and not more than 9 nmT. The bit error rate (BER) is effectively improved by setting the magnetic thickness to be not less than 1 nmT. For example, the formation of magnetic domains can be suppressed by setting the magnetic thickness to be 9 nmT or less. The reversal of the second magnetization 22M is easier. The formation of magnetic domains can be suppressed by setting the magnetic thickness to be 9 nmT or less. A fast magnetization reversal is obtained by a practical current density 320 at which the reliability can be ensured. The BER can be improved.

For example, it is favorable for the magnetic thickness of the second magnetic layer 22 to be substantially equal to the magnetic thickness of the first magnetic layer 21 or greater than the magnetic thickness of the first magnetic layer 21. For example, the magnetic thickness of the second magnetic layer 22 is not less than 0.8 times and not more than 3 times the magnetic thickness of the first magnetic layer 21. For example, the ratio of the magnetic thickness of the first magnetic layer 21 to the magnetic thickness of the second magnetic layer 22 is 2 nmT/6 nmT, 4 nmT/4 nmT, 4 nmT/6 nmT, etc. Thereby, for example, a fast magnetization reversal is obtained for the first magnetization 21M of the first magnetic layer 21 and the second magnetization 22M of the second magnetic layer 22.

In the magnetic heads 110 and 111, it is favorable for the thickness t25 of the first layer 25 to be, for example, greater than 0 nm and not more than 3 nm. By setting the thickness t25 to be 3 nm or less, the spin-transfer torque STT2 from the second magnetic layer 22 effectively acts on the first magnetic layer 21. The reversal of the first magnetization 21M of the first magnetic layer 21 is easier thereby.

In the magnetic head 111, it is favorable for the thickness t23 of the third magnetic layer 23 to be, for example, greater than 0 nm and not more than 2 nm. By setting the thickness t23 to be 2 nm or less, the distance Lg (the recording gap) can be prevented from becoming excessively long. The third magnetic layer 23 may be omitted. At least a portion of the third magnetic layer 23 may be considered to be included in the second magnetic pole 31.

Second Embodiment

FIGS. 8A to 8C are schematic cross-sectional views illustrating a magnetic recording device according to a second embodiment.

As shown in FIG. 8A, the magnetic recording device 210 according to the embodiment includes a magnetic head 120 and the magnetic recording medium 80. The magnetic head 120 includes the first magnetic pole 30, the second magnetic pole 31, and the stacked body 20. In the second embodiment, the stacked body 20 includes the first nonmagnetic layer 41, the first magnetic layer 21, the second nonmagnetic layer 42, the second magnetic layer 22, and the third nonmagnetic layer 43. The first magnetic layer 21 is provided between the first nonmagnetic layer 41 and the second magnetic pole 31. The second nonmagnetic layer 42 is provided between the first magnetic layer 21 and the second magnetic pole 31. The second magnetic layer 22 is provided between the second nonmagnetic layer 42 and the second magnetic pole 31. The third nonmagnetic layer 43 is provided between the second magnetic layer 22 and the second magnetic pole 31. The first layer 25 is not provided in the magnetic head 120. For example, the second nonmagnetic layer 42 contacts the first magnetic layer 21 and the second magnetic layer 22.

In the magnetic head 120, the first magnetic layer 21 includes at least one first element selected from the group consisting of Co, Fe, and Ni. The concentration of the first element in the first magnetic layer 21 is 50 atomic % or more. The second magnetic layer 22 includes at least one second element selected from the group consisting of Fe, Ni, and Co, and at least one third element selected from the group consisting of Cr, V, Mn, Ti, and Sc. The first magnetic layer 21 does not include the third element. Or, the concentration of the third element in the first magnetic layer 21 is less than the concentration of the third element in the second magnetic layer 22.

For example, the second magnetic layer 22 has a negative polarization. The first magnetic layer 21 does not have a polarization. Or, the magnitude (the absolute value) of the polarization of the first magnetic layer 21 is less than the magnitude (the absolute value) of the polarization of the second magnetic layer 22. Thus, the first magnetic layer 21 and the second magnetic layer 22 have asymmetric characteristics.

For example, by setting the Cr concentration of the FeCr alloy in the first magnetic layer 21 to be about 10%, the polarization of the first magnetic layer 21 is near zero. For example, the concentration (the composition ratio) of Cr in the FeCr alloy of the second magnetic layer 22 is not less than 30 atomic % and not more than 40 atomic %. Thereby, the polarization of the second magnetic layer 22 is negative and has a large absolute value. For example, because the portion of the second nonmagnetic layer 42 contacting the second magnetic layer 22 includes Cr, a negative polarization that has a large absolute value is obtained in the second magnetic layer 22.

For example, the composition of the FeCr alloy included in the first magnetic layer 21 may be substantially the same as the composition of the FeCr alloy included in the second magnetic layer 22. For example, the number of sputtering targets increases when the composition of the FeCr alloy included in the first magnetic layer 21 is different from the composition of the FeCr alloy included in the second magnetic layer 22 that has the negative polarization. For example, the polarization of the first magnetic layer 21 can be near zero by the first magnetic layer 21 including a stacked film including an FeCo alloy film that has a positive polarization and an FeCr alloy film that has a negative polarization and is of the same composition as the second magnetic layer 22.

In the magnetic head 120 as well, the electrical circuit supplies, to the stacked body 20, the first current i1 that has the first orientation D1 from the second magnetic pole 31 toward the first magnetic pole 30. Thereby, the first magnetization 21M of the first magnetic layer 21 and the second magnetization 22M of the second magnetic layer 22 are reversed similarly to the description recited above in reference to FIGS. 1A to 1C and FIGS. 3A to 3C. The first magnetization 21M and the second magnetization 22M have reverse components of the orientation of the magnetization 30M of the first magnetic pole 30. The recording magnetic field from the first magnetic pole 30 is easily oriented toward the magnetic recording medium 80. The recording magnetic field is efficiently applied to the magnetic recording medium 80. A magnetic head and a magnetic recording device can be provided in which the recording density can be increased.

The configurations such as the materials, the thicknesses, etc., of the first nonmagnetic layer 41, the first magnetic layer 21, the second nonmagnetic layer 42, the second magnetic layer 22, and the third nonmagnetic layer 43 described in reference to the magnetic head 110 and the magnetic head 111 are applicable to the magnetic head 120.

The second nonmagnetic layer 42 may include a stacked film including a Cu film and a Cr film. For example, a Cr film is provided at the second magnetic layer 22 interface side of the second nonmagnetic layer 42, and the second magnetic layer 22 and the Cr film contact each other. Thereby, the negative polarization of the second magnetic layer 22 is improved, and the magnetization reversal of the first magnetic layer 21 is easier.

Figure 9:
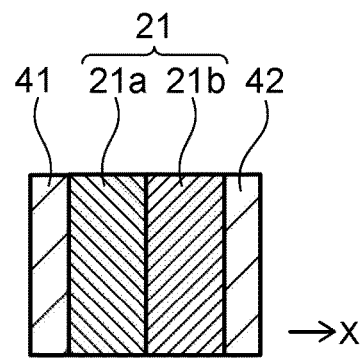
FIG. 9 is a schematic cross-sectional view illustrating the magnetic recording device according to the second embodiment.

FIG. 9 is a schematic cross-sectional view illustrating the magnetic recording device according to the second embodiment.

FIG. 9 illustrates an extracted portion of the stacked body 20. As shown in FIG. 9, the first magnetic layer 21 includes a first film 21a and a second film 21b. The second film 21b is at a first position between the first nonmagnetic layer 41 and the first film 21a or at a second position between the first film 21a and the second nonmagnetic layer 42. In the example of FIG. 9, the second film 21b is between the first film 21a and the second nonmagnetic layer 42. In the example as well, the second magnetic layer includes at least one second element selected from the group consisting of Fe, Ni, and Co, and at least one third element selected from the group consisting of Cr, V, Mn, Ti, and Sc.

The first film 21a includes the second element described above and the third element described above. In a first example, the second film 21b does not include the third element. In a second example, the concentration of the third element in the second film 21b is less than the concentration of the third element in the first film 21a. By using a configuration in which a magnetic film having a positive polarization and a magnetic film having a negative polarization are stacked, the polarization of the first magnetic layer 21 can be reduced, and the spin-transfer torque STT1 toward the first magnetic layer 21 can be reduced. For example, the composition of the first film is substantially the same as the composition of the second magnetic layer.

An example of a magnetic head and a magnetic recording medium according to the embodiment will now be described.

Figure 10:
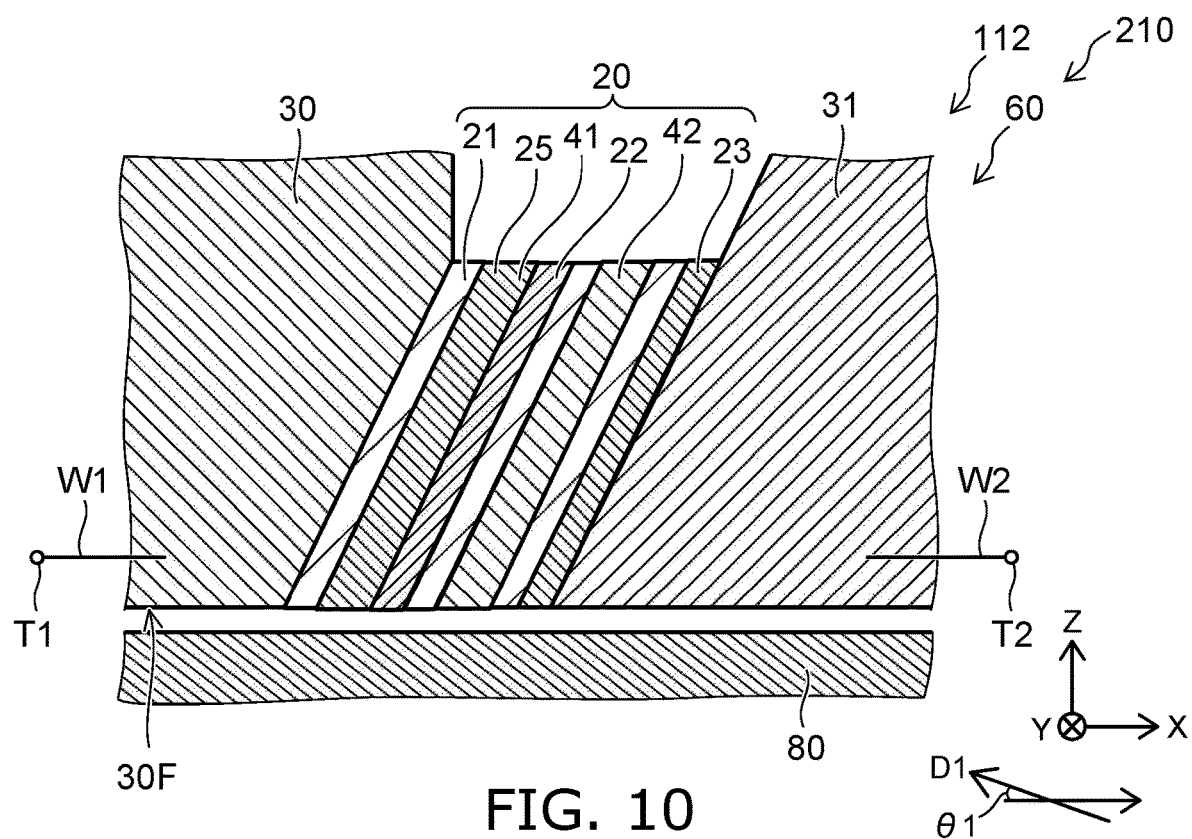
FIG. 10 is a schematic cross-sectional view illustrating the magnetic head according to the embodiment.

FIG. 10 is a schematic cross-sectional view illustrating the magnetic head according to the embodiment.

In the magnetic head 112 according to the embodiment as shown in FIG. 10, the first orientation D1 from the second magnetic pole 31 toward the first magnetic pole 30 may be tilted with respect to the X-axis direction. The first orientation D1 (or the second orientation D2) corresponds to the stacking direction of the stacked body 20. The X-axis direction is along a medium-facing surface 30F of the first magnetic pole 30. The first orientation D1 and the angle between the medium-facing surface 30F is taken as an angle θ1. The angle θ1 is, for example, not less than 15 degrees and not more than 30 degrees. The angle θ1 may be 0 degrees.

When the first orientation D1 is tilted with respect to the X-axis direction, the thicknesses (e.g., the thickness t21, etc.) of the layers correspond to lengths along the first orientation D1. The configuration in which the first orientation D1 is tilted with respect to the X-axis direction is applicable to any magnetic head according to the first or second embodiment.

An example of the magnetic head and the magnetic recording medium according to the embodiment will now be described. The example of the magnetic head 110 will be described.

Figure 11:
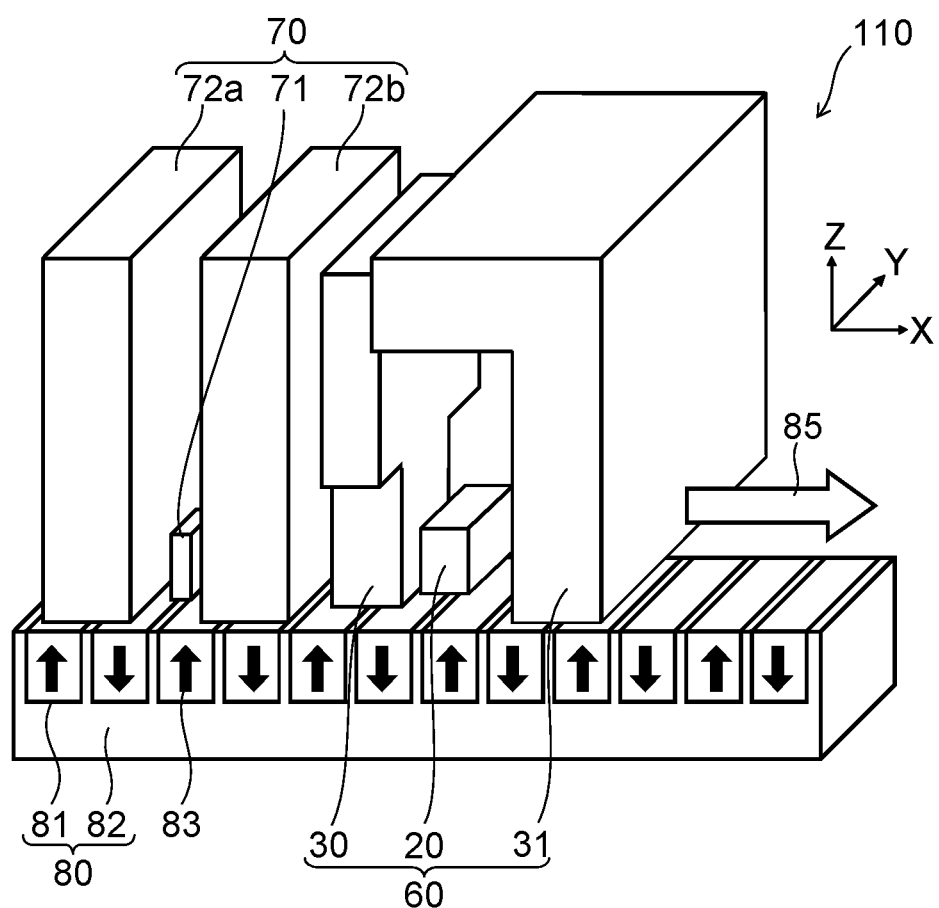
FIG. 11 is a schematic perspective view illustrating the magnetic recording device according to the embodiment.

FIG. 11 is a schematic perspective view illustrating the magnetic recording device according to the embodiment.

Figure 12:
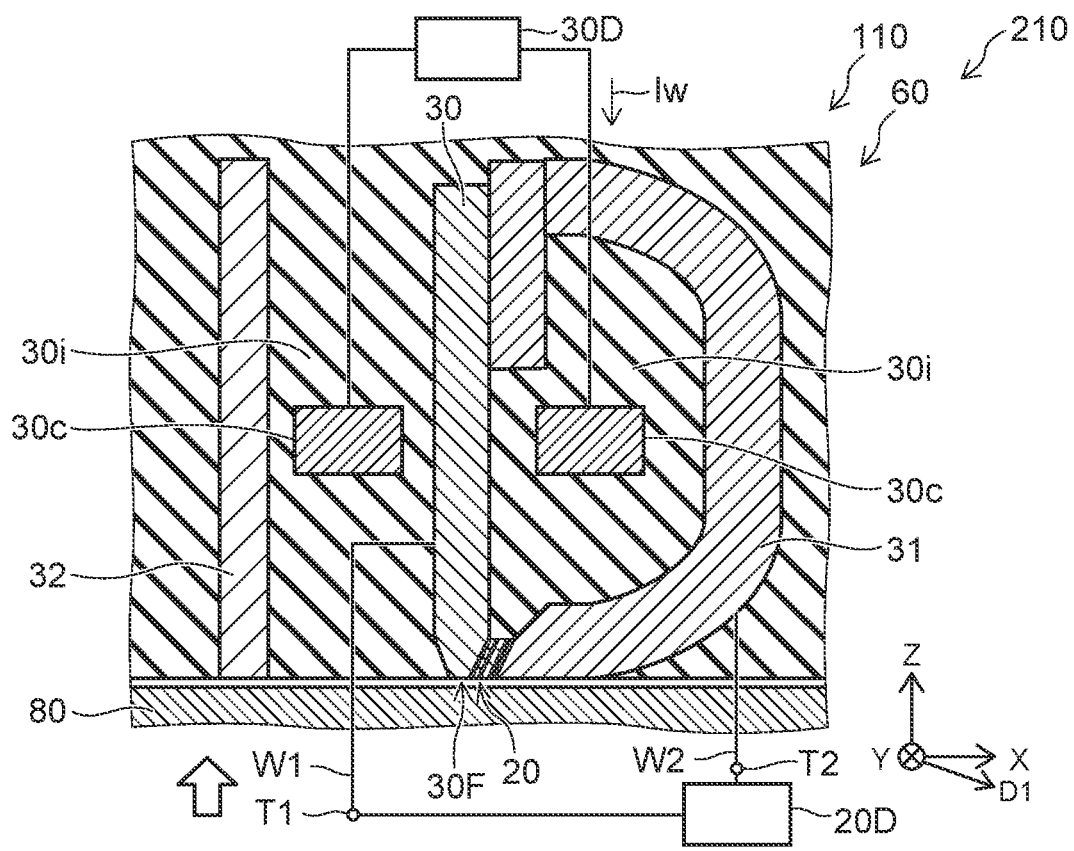
FIG. 12 is a schematic cross-sectional view illustrating the magnetic head according to the embodiment.

FIG. 12 is a schematic cross-sectional view illustrating the magnetic head according to the embodiment.

As shown in FIG. 11, the magnetic head 110 according to the embodiment is used with the magnetic recording medium 80. The magnetic recording device 210 according to the embodiment includes the magnetic head 110 and the magnetic recording medium 80. In the example, the magnetic head 110 includes a recording part 60 and a reproducing part 70. Information is recorded in the magnetic recording medium 80 by the recording part 60 of the magnetic head 110. The information that is recorded in the magnetic recording medium 80 is reproduced by the reproducing part 70.

The magnetic recording medium 80 includes, for example, a medium substrate 82, and a magnetic recording layer 81 provided on the medium substrate 82. A magnetization 83 of the magnetic recording layer 81 is controlled by the recording part 60.

The reproducing part 70 includes, for example, a first reproduction magnetic shield 72a, a second reproduction magnetic shield 72b, and a magnetic reproducing element 71. The magnetic reproducing element 71 is provided between the first reproduction magnetic shield 72a and the second reproduction magnetic shield 72b. The magnetic reproducing element 71 can output a signal corresponding to the magnetization 83 of the magnetic recording layer 81.

As shown in FIG. 11, the magnetic recording medium 80 moves relative to the magnetic head 110 in a medium movement direction 85. The information that corresponds to the magnetization 83 of the magnetic recording layer 81 is controlled by the magnetic head 110 at any position. The information that corresponds to the magnetization 83 of the magnetic recording layer 81 is reproduced by the magnetic head 110 at any position.

As shown in FIG. 12, a coil 30c is provided at the magnetic head 110. A recording current Iw is supplied from a recording circuit 30D to the coil 30c. The recording magnetic field that corresponds to the recording current Iw is applied from the first magnetic pole 30 to the magnetic recording medium 80.

As shown in FIG. 12, the first magnetic pole 30 includes the medium-facing surface 30F. The medium-facing surface 30F is, for example, an ABS (Air Bearing Surface). For example, the medium-facing surface 30F faces the magnetic recording medium 80.

A direction perpendicular to the medium-facing surface 30F is taken as a Z-axis direction. One direction perpendicular to the Z-axis direction is taken as the X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is, for example, the cross-track direction.

As shown in FIG. 12, the electrical circuit 20D is electrically connected to the stacked body 20. In the example, the stacked body 20 is electrically connected to the first magnetic pole 30 and the second magnetic pole 31. A first terminal T1 and a second terminal T2 are provided in the magnetic head 110. The first terminal T1 is electrically connected to the stacked body 20 via wiring W1 and the first magnetic pole 30. The second terminal T2 is electrically connected to the stacked body 20 via wiring W2 and the second magnetic pole 31. For example, a current (e.g., a direct current) is supplied from the electrical circuit 20D to the stacked body 20.

As shown in FIG. 12, a shield 32 may be provided in the recording part 60. The first magnetic pole 30 is provided between the shield 32 and the second magnetic pole 31. An insulating portion 30i is provided around the second magnetic pole 31, the second magnetic pole 31, and the first magnetic pole 30.

The magnetic recording device 210 according to the embodiment includes the magnetic head 110, and the magnetic recording medium 80 in which the information is recorded by the magnetic head 110. An example of the magnetic recording device according to the embodiment will now be described. The magnetic recording device may be a magnetic recording and reproducing device. The magnetic head may include a recording part and a reproducing part.

Figure 13:
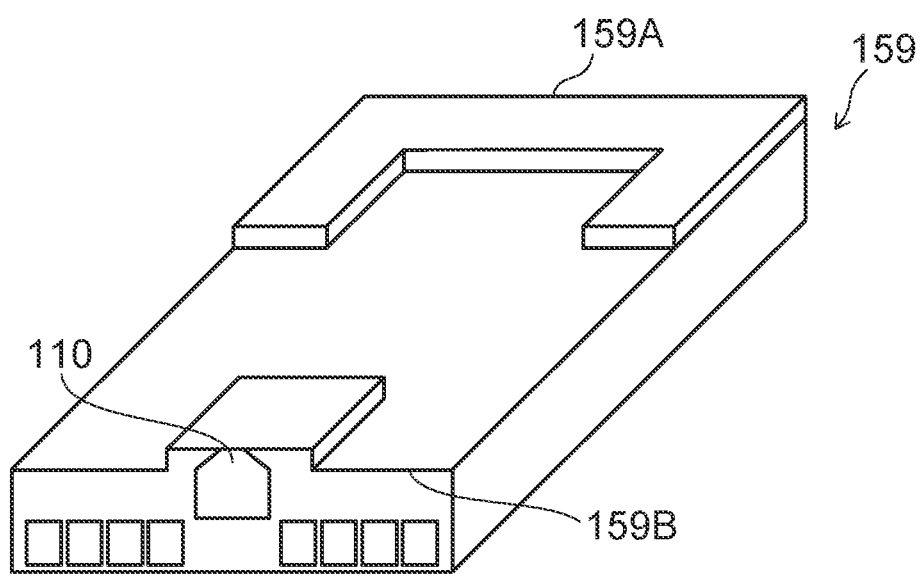
FIG. 13 is a schematic perspective view illustrating a portion of the magnetic recording device according to the embodiment.

FIG. 13 is a schematic perspective view illustrating a portion of the magnetic recording device according to the embodiment.

FIG. 13 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 14:
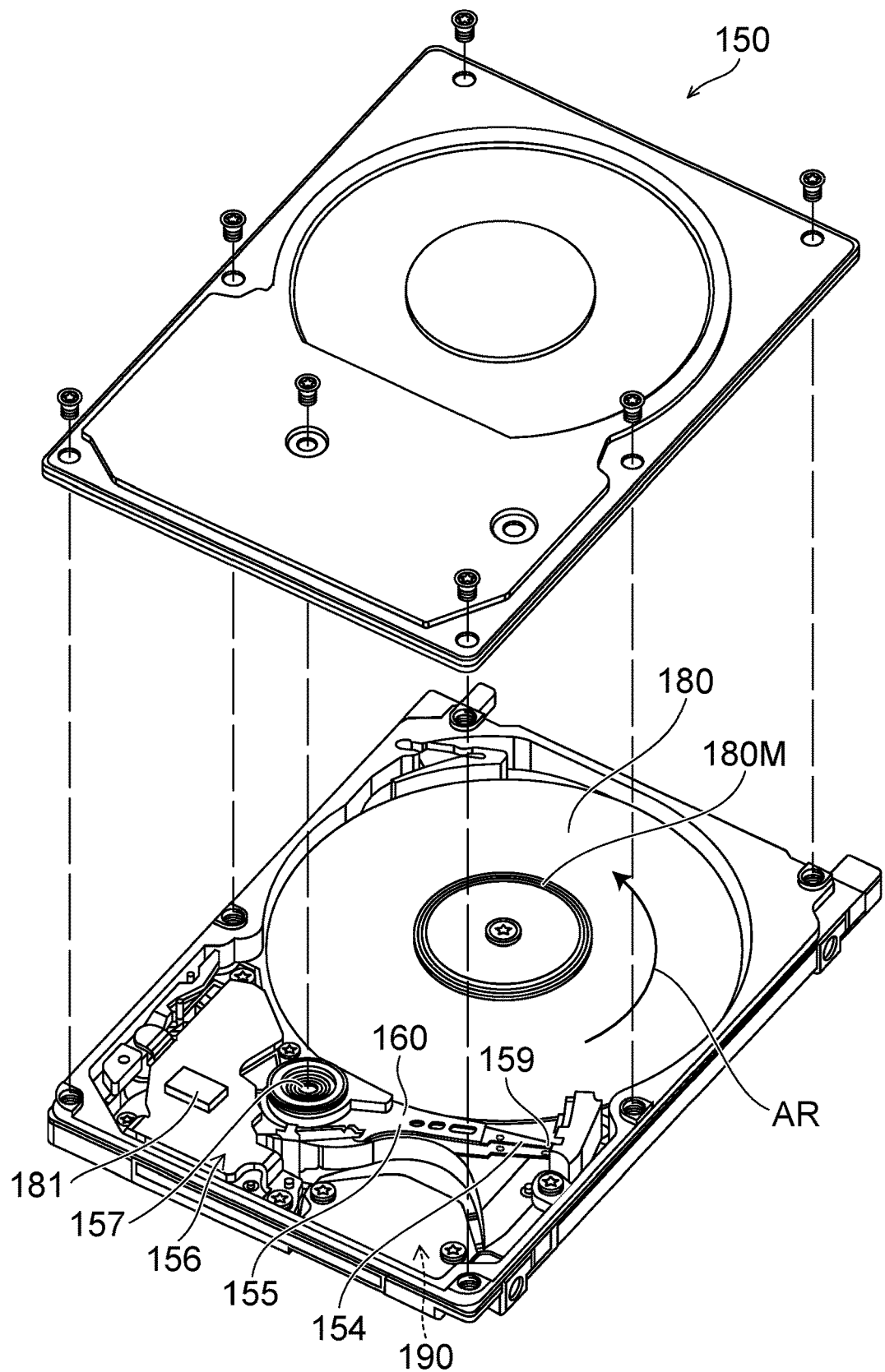
FIG. 14 is a schematic perspective view illustrating a magnetic recording device according to the embodiment.

FIG. 14 is a schematic perspective view illustrating a magnetic recording device according to the embodiment.

Figure 15A:
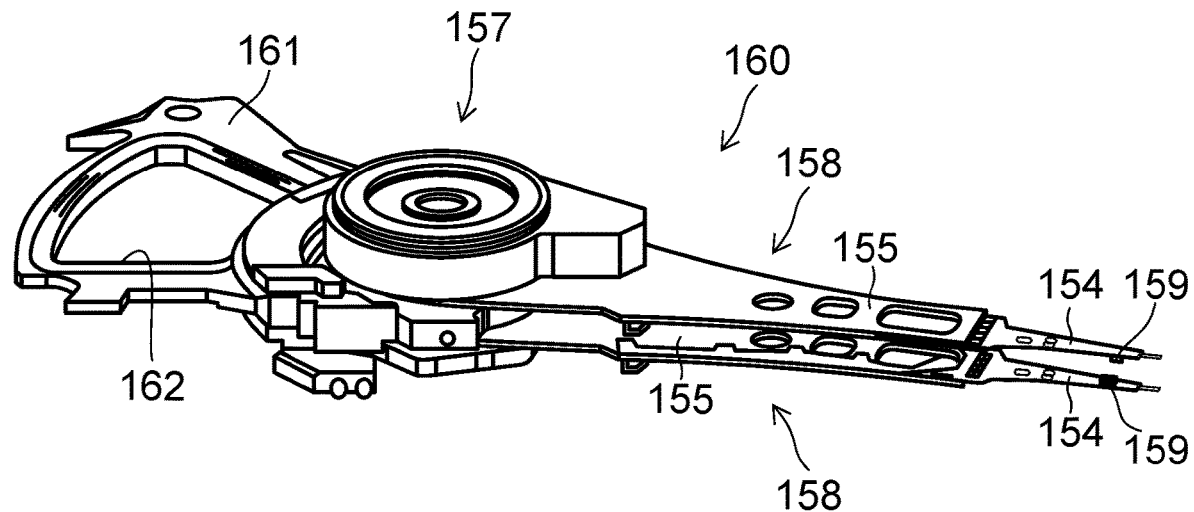
FIGS. 15A and 15B are schematic perspective views illustrating a portion of the magnetic recording device according to the embodiment.
Figure 15B:
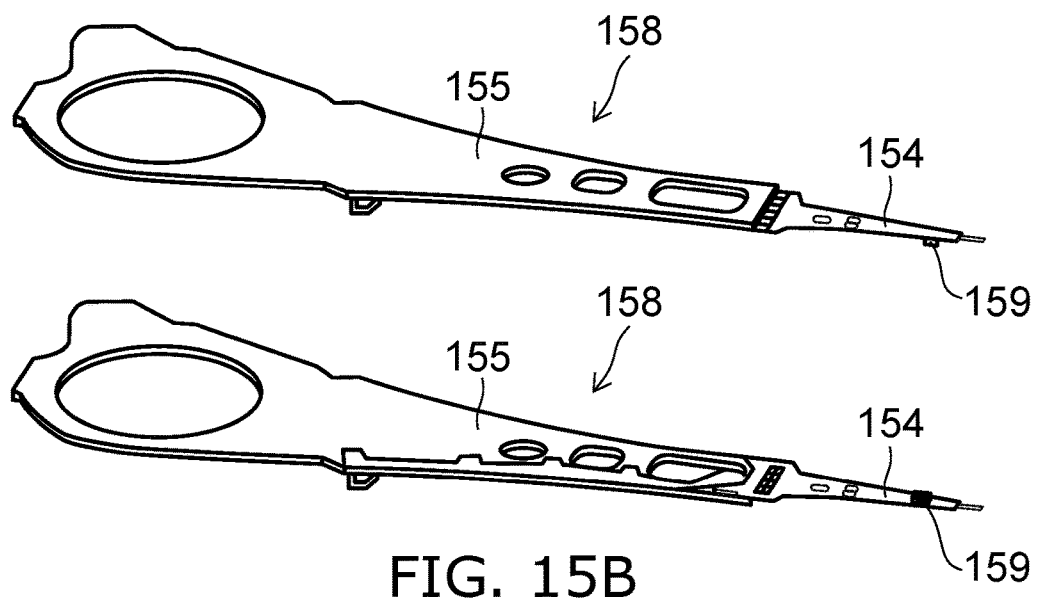

FIGS. 15A and 15B are schematic perspective views illustrating a portion of the magnetic recording device according to the embodiment.

As shown in FIG. 14, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 includes one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 15A illustrates the configuration of a portion of the magnetic recording device and is an enlarged perspective view of a head stack assembly 160.

FIG. 15B is a perspective view illustrating a magnetic head assembly (a head gimbal assembly (HGA)) 158 that is a portion of the head stack assembly 160.

As shown in FIG. 15A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 15B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin-transfer torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

The embodiments may include the following configurations (e.g., technological proposals).

Configuration 1

A magnetic recording device, comprising:
a magnetic head; and
an electrical circuit,
the magnetic head including
a first magnetic pole,
a second magnetic pole, and
a stacked body provided between the first magnetic pole and the second magnetic pole,
the stacked body including
a first nonmagnetic layer,
a first magnetic layer provided between the first nonmagnetic layer and the second magnetic pole,
a first layer provided between the first magnetic layer and the second magnetic pole,
a second nonmagnetic layer provided between the first layer and the second magnetic pole,
a second magnetic layer provided between the second nonmagnetic layer and the second magnetic pole, and
a third nonmagnetic layer provided between the second magnetic layer and the second magnetic pole,
the first magnetic layer including at least one first element selected from the group consisting of Co, Fe, and Ni, a concentration of the first element in the first magnetic layer being 50 atomic % or more,
the second magnetic layer including at least one second element selected from the group consisting of Fe, Ni, and Co, and at least one third element selected from the group consisting of Cr, V, Mn, Ti, and Sc,
the first layer including at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu,
the electrical circuit supplying, to the stacked body, a first current having a first orientation from the second magnetic pole toward the first magnetic pole.

Configuration 2

The magnetic recording device according to Configuration 1, wherein the first layer contacts the first magnetic layer and the second nonmagnetic layer.

Configuration 3

The magnetic recording device according to Configuration 2, wherein the second nonmagnetic layer contacts the first layer and the second magnetic layer.

Configuration 4

The magnetic recording device according to any one of Configurations 1 to 3, wherein a thickness of the first layer is greater than 0 nm and not more than 3 nm.

Configuration 5

A magnetic recording device, comprising:

a magnetic head; and an electrical circuit, the magnetic head including a first magnetic pole, a second magnetic pole, and a stacked body provided between the first magnetic pole and the second magnetic pole, the stacked body including a first nonmagnetic layer, a first magnetic layer provided between the first nonmagnetic layer and the second magnetic pole, a second nonmagnetic layer provided between the first magnetic layer and the second magnetic pole, a second magnetic layer provided between the second nonmagnetic layer and the second magnetic pole, and a third nonmagnetic layer provided between the second magnetic layer and the second magnetic pole.

the first magnetic layer including at least one first element selected from the group consisting of Co, Fe, and Ni, a concentration of the first element in the first magnetic layer being 50 atomic % or more, the second magnetic layer including at least one second element selected from the group consisting of Fe, Ni, and Co, and at least one third element selected from the group consisting of Cr, V, Mn, Ti, and Sc, the first magnetic layer not including the third element, or a concentration of the third element in the first magnetic layer being less than a concentration of the third element in the second magnetic layer, the electrical circuit supplying, to the stacked body, a first current having a first orientation from the second magnetic pole toward the first magnetic pole.

Configuration 6

A magnetic recording device, comprising:

a magnetic head; and an electrical circuit, the magnetic head including a first magnetic pole, a second magnetic pole, and a stacked body provided between the first magnetic pole and the second magnetic pole, the stacked body including a first nonmagnetic layer, a first magnetic layer provided between the first nonmagnetic layer and the second magnetic pole, a second nonmagnetic layer provided between the first magnetic layer and the second magnetic pole, a second magnetic layer provided between the second nonmagnetic layer and the second magnetic pole, and a third nonmagnetic layer provided between the second magnetic layer and the second magnetic pole, the second magnetic layer including at least one second element selected from the group consisting of Fe, Ni, and Co, and at least one third element selected from the group consisting of Cr, V, Mn, Ti, and Sc, the first magnetic layer including a first film and a second film, the second film being at a first position or a second position, the first position being between the first nonmagnetic layer and the first film, the second position being between the first film and the second nonmagnetic layer, the first film including the second and third elements, the second film not including the third element, or a concentration of the third element in the second film being less than a concentration of the third element in the first film, the electrical circuit supplying, to the stacked body, a first current having a first orientation from the second magnetic pole toward the first magnetic pole.

Configuration 7

The magnetic recording device according to Configuration 6, wherein a composition of the first film is substantially the same as a composition of the second magnetic layer.

Configuration 8

The magnetic recording device according to any one of Configurations 5 to 7, wherein the second nonmagnetic layer contacts the first magnetic layer and the second magnetic layer.

Configuration 9

The magnetic recording device according to any one of Configurations 1 to 8, wherein the first nonmagnetic layer includes at least one selected from the group consisting of Ta, Ru, Cr, and Cu.

Configuration 10

The magnetic recording device according to any one of Configurations 1 to 9, wherein the second nonmagnetic layer includes at least one selected from the group consisting of Cu, Ag, Au, and Cr.

Configuration 11

The magnetic recording device according to any one of Configurations 1 to 10, wherein the third nonmagnetic layer includes at least one selected from the group consisting of Cu, Ag, and Au.

Configuration 12

The magnetic recording device according to any one of Configurations 1 to 11, wherein a thickness of the first nonmagnetic layer is not less than 1 nm and not more than 6 nm.

Configuration 13

The magnetic recording device according to any one of Configurations 1 to 12, wherein a thickness of the second nonmagnetic layer is not less than 1 nm and not more than 4 nm.

Configuration 14

The magnetic recording device according to any one of Configurations 1 to 13, wherein a thickness of the third nonmagnetic layer is not less than 1 nm and not more than 4 nm.

Configuration 15

The magnetic recording device according to any one of Configurations 1 to 14, wherein a product of a saturation magnetization of the first magnetic layer and a thickness of the first magnetic layer is not less than 1 nmT and not more than 6 nmT.

Configuration 16

The magnetic recording device according to any one of Configurations 1 to 15, wherein a product of a saturation magnetization of the second magnetic layer and a thickness of the second magnetic layer is not less than 1 nmT and not more than 9 nmT.

Configuration 17

The magnetic recording device according to any one of Configurations 1 to 16, wherein a thickness of the second magnetic layer is not less than 0.8 times and not more than 3 times a thickness of the first magnetic layer.

Configuration 18

The magnetic recording device according to any one of Configurations 1 to 17, wherein the stacked body further includes a third magnetic layer provided between the third nonmagnetic layer and the second magnetic pole, the third magnetic layer includes at least one fourth element selected from the group consisting of Co, Fe, and Ni, and a concentration of the fourth element in the third magnetic layer is 50 atomic % or more.

Configuration 19

A magnetic recording device, comprising:
a magnetic head; and
an electrical circuit,
the magnetic head including
a first magnetic pole,
a second magnetic pole, and
a stacked body provided between the first magnetic pole and the second magnetic pole,
the stacked body including
a first nonmagnetic layer,
a first magnetic layer provided between the first nonmagnetic layer and the second magnetic pole,
a first layer provided between the first magnetic layer and the second magnetic pole,
a second nonmagnetic layer provided between the first layer and the second magnetic pole,
a second magnetic layer provided between the second nonmagnetic layer and the second magnetic pole, and
a third nonmagnetic layer provided between the second magnetic layer and the second magnetic pole,
the first magnetic layer including at least one first element selected from the group consisting of Co, Fe, and Ni, a concentration of the first element in the first magnetic layer being 50 atomic % or more,
the second magnetic layer including at least one second element selected from the group consisting of Fe, Ni, and Co, and at least one third element selected from the group consisting of Cr, V, Mn, Ti, and Sc,
the electrical circuit supplying, to the stacked body, a first current having a first orientation from the second magnetic pole toward the first magnetic pole.

Configuration 20

The magnetic recording device according to any one of Configurations 1 to 19, wherein a change rate of an electrical resistance of the stacked body with respect to a change of a current density flowing in the stacked body is positive when the current density is in a first range, negative when the current density is in a second range, and positive when the current density is in a third range, and a current density of the first current is within the third range.

Configuration 21

The magnetic recording device according to Configuration 20, wherein a first magnetization of the first magnetic layer has a component in the first orientation when the first current is supplied to the stacked body, a second magnetization of the second magnetic layer has a component in the first orientation when the first current is supplied to the stacked body, the first magnetization has a component in a second orientation when a second current having the first orientation is supplied to the stacked body, the second orientation being from the first magnetic pole toward the second magnetic pole, the second current being less than the first current, the second magnetization having a component in the second orientation when the second current is supplied to the stacked body, and a current density of the second current is within the first range.

Configuration 22

The magnetic recording device according to any one of Configurations 1 to 21, further comprising:

a magnetic recording medium, when the first current is supplied to the stacked body, the stacked body does not generate an alternating current magnetic field, or a frequency of an alternating current magnetic field generated from the stacked body is greater than a magnetic resonant frequency of the magnetic recording medium.

Configuration 23

A magnetic head, comprising:
a first magnetic pole;
a second magnetic pole; and
a stacked body provided between the first magnetic pole and the second magnetic pole,
the stacked body including
a first nonmagnetic layer,
a first magnetic layer provided between the first nonmagnetic layer and the second magnetic pole,
a first layer provided between the first magnetic layer and the second magnetic pole,
a second nonmagnetic layer provided between the first layer and the second magnetic pole,
a second magnetic layer provided between the second nonmagnetic layer and the second magnetic pole, and
a third nonmagnetic layer provided between the second magnetic layer and the second magnetic pole,
the first magnetic layer including at least one first element selected from the group consisting of Co, Fe, and Ni, a concentration of the first element in the first magnetic layer being 50 atomic % or more,
the second magnetic layer including at least one second element selected from the group consisting of Fe, Ni, and Co, and at least one third element selected from the group consisting of Cr, V, Mn, Ti, and Sc,
the first layer including at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu,
a first current being supplied to the stacked body and having a first orientation from the second magnetic pole toward the first magnetic pole.

Configuration 24

A magnetic head, comprising:
a first magnetic pole;
a second magnetic pole; and
a stacked body provided between the first magnetic pole and the second magnetic pole, the stacked body including
a first nonmagnetic layer,
a first magnetic layer provided between the first nonmagnetic layer and the second magnetic pole,
a first layer provided between the first magnetic layer and the second magnetic pole,
a second nonmagnetic layer provided between the first layer and the second magnetic pole,
a second magnetic layer provided between the second nonmagnetic layer and the second magnetic pole, and
a third nonmagnetic layer provided between the second magnetic layer and the second magnetic pole,
the first magnetic layer including at least one first element selected from the group consisting of Co, Fe, and Ni, a concentration of the first element in the first magnetic layer being 50 atomic % or more,
the second magnetic layer including at least one second element selected from the group consisting of Fe, Ni, and Co, and at least one third element selected from the group consisting of Cr, V, Mn, Ti, and Sc,
the first magnetic layer not including the third element, or a concentration of the third element in the first magnetic layer being less than a concentration of the third element in the second magnetic layer,
a first current being supplied to the stacked body and having a first orientation from the second magnetic pole toward the first magnetic pole.

Configuration 25

A magnetic head, comprising:
a first magnetic pole;
a second magnetic pole; and
a stacked body provided between the first magnetic pole and the second magnetic pole,
the stacked body including
a first nonmagnetic layer,
a first magnetic layer provided between the first nonmagnetic layer and the second magnetic pole,
a first layer provided between the first magnetic layer and the second magnetic pole,
a second nonmagnetic layer provided between the first layer and the second magnetic pole,
a second magnetic layer provided between the second nonmagnetic layer and the second magnetic pole, and
a third nonmagnetic layer provided between the second magnetic layer and the second magnetic pole,
the second magnetic layer including at least one second element selected from the group consisting of Fe, Ni, and Co, and at least one third element selected from the group consisting of Cr, V, Mn, Ti, and Sc,
the first magnetic layer including a first film and a second film, the second film being at a first position or a second position, the first position being between the first nonmagnetic layer and the first film, the second position being between the first film and the second nonmagnetic layer,
the first film including the second and third elements,
the second film not including the third element, or a concentration of the third element in the second film being less than a concentration of the third element in the first film,
a first current being supplied to the stacked body and having a first orientation from the second magnetic pole toward the first magnetic pole.

Configuration 26

A magnetic head, comprising:
a first magnetic pole;
a second magnetic pole; and
a stacked body provided between the first magnetic pole and the second magnetic pole,
the stacked body including
a first nonmagnetic layer,
a first magnetic layer provided between the first nonmagnetic layer and the second magnetic pole,
a first layer provided between the first magnetic layer and the second magnetic pole,
a second nonmagnetic layer provided between the first layer and the second magnetic pole,
a second magnetic layer provided between the second nonmagnetic layer and the second magnetic pole, and
a third nonmagnetic layer provided between the second magnetic layer and the second magnetic pole,
the first magnetic layer including at least one first element selected from the group consisting of Co, Fe, and Ni, a concentration of the first element in the first magnetic layer being 50 atomic % or more,
the second magnetic layer including at least one second element selected from the group consisting of Fe, Ni, and Co, and at least one third element selected from the group consisting of Cr, V, Mn, Ti, and Sc,
a first current being supplied to the stacked body and having a first orientation from the second magnetic pole toward the first magnetic pole.

According to the embodiments, a magnetic head and a magnetic recording device can be provided in which the recording density can be increased. In the embodiments, the first magnetic pole 30 may be a trailing shield, and the second magnetic pole 31 may be a major magnetic pole.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as first magnetic poles, second magnetic poles, second shields, stacked bodies, magnetic layers, nonmagnetic layers, layers, wires, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
   a magnetic head; and
   an electrical circuit,
   the magnetic head including
      a first magnetic pole,
      a second magnetic pole, and
      a stacked body provided between the first magnetic pole and the second magnetic pole,
   the stacked body including
      a first nonmagnetic layer,
      a first magnetic layer provided between the first nonmagnetic layer and the second magnetic pole,
      a first layer provided between the first magnetic layer and the second magnetic pole,
      a second nonmagnetic layer provided between the first layer and the second magnetic pole,
      a second magnetic layer provided between the second nonmagnetic layer and the second magnetic pole, and
      a third nonmagnetic layer provided between the second magnetic layer and the second magnetic pole,
   the first magnetic layer including at least one first element selected from the group consisting of Co, Fe, and Ni, a concentration of the first element in the first magnetic layer being 50 atomic % or more,
   the second magnetic layer including at least one second element selected from the group consisting of Fe, Ni, and Co, and at least one third element selected from the group consisting of Cr, V, Mn, Ti, and Sc,
   the first layer including at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu,
   the electrical circuit being configured to supply, to the stacked body, a first current having a first orientation from the second magnetic pole toward the first magnetic pole, wherein the first orientation of the first current is opposite to an electron current orientation, and
   wherein the first layer contacts the first magnetic layer and the second nonmagnetic layer.

2. The magnetic recording device according to claim 1, wherein
   the second nonmagnetic layer contacts the first layer and the second magnetic layer.

3. The magnetic recording device according to claim 1, wherein a thickness of the first layer is greater than 0 nm and not more than 3 nm.

4. The magnetic recording device according to claim 1, wherein
   the first nonmagnetic layer includes at least one selected from the group consisting of Ta, Ru, Cr, and Cu.

5. The magnetic recording device according to claim 1, wherein
   the second nonmagnetic layer includes at least one selected from the group consisting of Cu, Ag, Au, and Cr.

6. The magnetic recording device according to claim 1, wherein
   the third nonmagnetic layer includes at least one selected from the group consisting of Cu, Ag, and Au.

7. The magnetic recording device according to claim 1, wherein
   a thickness of the first nonmagnetic layer is not less than 1 nm and not more than 6 nm.

8. The magnetic recording device according to claim 1, wherein
   a thickness of the second nonmagnetic layer is not less than 1 nm and not more than 4 nm.

9. The magnetic recording device according to claim 1, wherein
   a thickness of the third nonmagnetic layer is not less than 1 nm and not more than 4 nm.

10. The magnetic recording device according to claim 1, wherein
    a product of a saturation magnetization of the first magnetic layer and a thickness of the first magnetic layer is not less than 1 nmT and not more than 6 nmT.

11. The magnetic recording device according to claim 1, wherein
    a product of a saturation magnetization of the second magnetic layer and a thickness of the second magnetic layer is not less than 1 nmT and not more than 9 nmT.

12. The magnetic recording device according to claim 1, wherein
    a thickness of the second magnetic layer is not less than 0.8 times and not more than 3 times a thickness of the first magnetic layer.

13. The magnetic recording device according to claim 1, wherein
    the stacked body further includes a third magnetic layer provided between the third nonmagnetic layer and the second magnetic pole,
    the third magnetic layer includes at least one fourth element selected from the group consisting of Co, Fe, and Ni, and
    a concentration of the fourth element in the third magnetic layer is 50 atomic % or more.

14. The magnetic recording device according to claim 1, wherein
    a change rate of an electrical resistance of the stacked body with respect to a change of a current density flowing in the stacked body is positive when the current density is in a first range, negative when the current density is in a second range, and positive when the current density is in a third range, and
    a current density of the first current is within the third range.

* * * * *